US012572807B2

(12) United States Patent
Harvey et al.

(10) Patent No.: US 12,572,807 B2
(45) Date of Patent: Mar. 10, 2026

(54) NEURAL NETWORK METHODS FOR DEFINING SYSTEM TOPOLOGY

(71) Applicants: Troy Aaron Harvey, Brighton, UT (US); Jeremy David Fillingim, Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 741 days.

(21) Appl. No.: 17/009,713

(22) Filed: Sep. 1, 2020

(65) Prior Publication Data

US 2021/0383200 A1       Dec. 9, 2021

Related U.S. Application Data

(60) Provisional application No. 62/704,976, filed on Jun. 5, 2020.

(51) Int. Cl.
*G06N 3/084* (2023.01)
*B60H 1/00* (2006.01)
(Continued)

(52) U.S. Cl.
CPC ......... *G06N 3/084* (2013.01); *B60H 1/00285* (2013.01); *F24F 11/64* (2018.01); *F24F 11/65* (2018.01); *G05B 13/027* (2013.01); *G05B 13/04* (2013.01); *G05B 19/042* (2013.01); *G06F 17/16* (2013.01); *G06F 30/18* (2020.01); *G06F 30/27* (2020.01); *G06N 3/04* (2013.01); *G06N 3/047* (2023.01); *G06N*

*3/048* (2023.01); *G06N 3/063* (2013.01); *G06N 3/08* (2013.01); *G06Q 10/067* (2013.01); *G06Q 50/163* (2013.01);
(Continued)

(58) Field of Classification Search
CPC .......... G06N 3/04; G06N 3/063; G06N 3/084; G06N 3/048; G06N 3/08; G06F 9/30036; G06F 30/18; G06F 30/27; G06F 17/16; F24F 11/64; F24F 11/65; B60H 1/00285; G05B 13/027; G05B 13/04; G05B 19/042; G06Q 10/067; G06Q 50/163
See application file for complete search history.

(56) References Cited

U.S. PATENT DOCUMENTS

| | | | |
|---|---|---|---|
| 5,224,648 | A | 7/1993 | Simon et al. |
| 5,581,659 | A | 12/1996 | Takatori |

(Continued)

OTHER PUBLICATIONS

Singaravel et al. (Deep-learning neural-network architectures and methods: Using component-based models in building-design energy prediction, Jun. 2018, pp. 81-90) (Year: 2018).*
(Continued)

*Primary Examiner* — George Giroux

(57) ABSTRACT

A neural network in one embodiment is built by decomposing a structure into different building materials creating neurons that represent building materials and open spaces in a structure. Subsystems in the building have their neurons concatenated together to create same length neuron strings. In some embodiments, neurons in a short neuron string are split to make longer neuron strings. In some embodiments, neurons are added to some neuron strings to represent inside features, air features, and outside features.

20 Claims, 17 Drawing Sheets

(51) Int. Cl.

| | |
|---|---|
| F24F 11/64 | (2018.01) |
| F24F 11/65 | (2018.01) |
| G05B 13/02 | (2006.01) |
| G05B 13/04 | (2006.01) |
| G05B 19/042 | (2006.01) |
| G06F 17/16 | (2006.01) |
| G06F 30/18 | (2020.01) |
| G06F 30/27 | (2020.01) |
| G06N 3/04 | (2023.01) |
| G06N 3/047 | (2023.01) |
| G06N 3/048 | (2023.01) |
| G06N 3/063 | (2023.01) |
| G06N 3/08 | (2023.01) |
| G06Q 10/067 | (2023.01) |
| G06Q 50/163 | (2024.01) |
| F24F 120/10 | (2018.01) |
| F24F 120/20 | (2018.01) |
| F24F 140/50 | (2018.01) |
| G06F 119/06 | (2020.01) |
| G06F 119/08 | (2020.01) |

(52) U.S. Cl.
    CPC ....... *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(56) References Cited

U.S. PATENT DOCUMENTS

| | | | |
|---|---|---|---|
| 5,740,324 A | 4/1998 | Mathur et al. | |
| 6,119,125 A | 9/2000 | Gloudeman et al. | |
| 6,967,565 B2 | 11/2005 | Lingemann | |
| 7,447,664 B2 | 11/2008 | Pado | |
| 7,620,613 B1 | 11/2009 | Moore et al. | |
| 7,756,804 B2 | 7/2010 | Bloom et al. | |
| 8,626,700 B1* | 1/2014 | Monraz | G06N 3/049 |
| | | | 706/59 |
| 9,020,647 B2 | 4/2015 | Johnson et al. | |
| 9,258,201 B2 | 2/2016 | McCoy et al. | |
| 9,298,197 B2 | 3/2016 | Matsuoka et al. | |
| 9,557,750 B2 | 1/2017 | Gust et al. | |
| 9,664,400 B2 | 5/2017 | Wroblewski et al. | |
| 9,857,238 B2 | 1/2018 | Malhotra et al. | |
| 10,013,644 B2 | 7/2018 | Takahashi | |
| 10,094,586 B2 | 10/2018 | Pavlovski et al. | |
| 10,140,544 B1 | 11/2018 | Zhao et al. | |
| 10,545,517 B2 | 1/2020 | Matsuoka et al. | |
| 10,845,815 B2 | 11/2020 | Palanisamy et al. | |
| 10,896,679 B1* | 1/2021 | Hu | G10L 15/063 |
| 2002/0152298 A1 | 10/2002 | Kikta et al. | |
| 2004/0044677 A1* | 3/2004 | Huper-Graff | G06Q 30/02 |
| | | | 707/999.102 |
| 2008/0082183 A1 | 4/2008 | Judge | |
| 2008/0277486 A1 | 11/2008 | Seem et al. | |
| 2010/0025483 A1 | 2/2010 | Hoeynck et al. | |
| 2014/0277757 A1 | 9/2014 | Wang et al. | |
| 2014/0312128 A1 | 10/2014 | Matsuoka et al. | |
| 2015/0300892 A1 | 10/2015 | Malhotra et al. | |
| 2016/0201934 A1 | 7/2016 | Hester et al. | |
| 2016/0313752 A1 | 10/2016 | Przybylski | |
| 2017/0091615 A1 | 3/2017 | Liu et al. | |
| 2017/0322579 A1 | 11/2017 | Goparaju et al. | |
| 2018/0165573 A1* | 6/2018 | Hsu | G06N 3/04 |
| 2018/0202678 A1 | 7/2018 | Ahuja et al. | |
| 2018/0266716 A1 | 9/2018 | Bender et al. | |
| 2018/0365558 A1 | 12/2018 | Sekiyama et al. | |
| 2019/0018067 A1 | 1/2019 | Kong et al. | |
| 2019/0219293 A1 | 7/2019 | Wenzel et al. | |
| 2019/0360711 A1 | 11/2019 | Sohn et al. | |
| 2020/0080744 A1 | 3/2020 | Sohn et al. | |
| 2020/0196973 A1 | 6/2020 | Zhou et al. | |
| 2020/0355391 A1 | 11/2020 | Wenzel et al. | |
| 2021/0182660 A1 | 6/2021 | Amirguliyev et al. | |
| 2021/0191342 A1 | 6/2021 | Lee et al. | |
| 2021/0286688 A1 | 9/2021 | Liu et al. | |
| 2023/0034809 A1 | 2/2023 | Lee et al. | |

OTHER PUBLICATIONS

Nasruddin et al. (Optimization of HVAC system energy consumption in a building using artificial neural network and multi-objective genetic algorithm, Oct. 2018, pp. 48-57) (Year: 2018).*

Zhao (Steel columns under fire—a neural network based strength model, Mar. 2004, pp. 97-105) (Year: 2004).*

Tijskens et al. (Neural networks for metamodeling the hygrothermal behaviour of building components, Jul. 2019, pp. 1-11) (Year: 2019).*

Afram et al. (Artificial neural network (ANN) based model predictive control (MPC) and optimization of HVAC systems: A state of the art review and case study of a residential HVAC system, Feb. 2017, pp. 96-112) (Year: 2017).*

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge, et al., A Standard Predictive index of Human Response to the Thermal Environment, ASHRAE Transactions 1986, Part 2B.

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, Nabil, (2005), Optimization of HVAC control system strategy using two-objective genetic algorithm [microform].

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Vanus et al., The design of an indirect method for the human presence monitoring in the intelligent building,Human-centric Computing and Information Sciences 8, Article No. 28 (2018).

Xiao et al., "Automatic Continuous Commissioning of Measurement Instruments in Air Handling Units," Building Commissioning for Energy Efficiency and Comfort, 2006, vol. VI-1-3, Shenzhen, China.

Nassif et al., "Self-tuning dynamic models of HVAC system components," 2008, Elsiever, Energy and Buildings 40, 1709-1720.

Rao, C++ Neural Networks and Fuzzy Logic, Jun. 1, 1995, MT Books, IDG Books Worldwide, Ind.

Rios, at al., "Derivative-free optimization: a review of algorithms and comparison of software implementations", J Glob Optimizers (2013) 56;1247-1293.

Sabor, et al., "Dynamic Routing Between Capsules," NIPS'17: Proceedings of the 31st International Conference on Neural Information Processing Systems, Dec. 2017, pp. 3859-3869.

Veelenturf, L. P. J., Analysis and applications of artificial neural networks, 1995, Prentice Hall International (UKD) Ltd, United Kingdom.

Welsh, "Ongoing Commissioning (OCx) with BAS and Data Loggers," National Conference on Building Commissioning: Jun. 3-5, 2009.

(56)           References Cited

OTHER PUBLICATIONS

Veelenturf, L. P. J., Analysis and applications of artificial neural networks, 1995, Prentice Hall International (UK0) Ltd, United Kingdom.

Asaad, et al., Back Propagation Neural Networks (BPNN) and Sigmoid Activation Function in Multi-Layer Networks, Academic Journal of Nawroz University 8(4):216, Nov. 2019.

Ferguson and Green, Deeply Learning Derivatives, arXiv:1809. 02233, Oct. 14, 2018.

Guo, BackPropagation Through Time, 2013.

Jang et al., Deep neural networks with a set of node-wise varying activation functions, Neural Networks 126 (2020) 118-131.

Sharma et al., Activation Functions in Neural Networks, Intentional Journal of Engineering Applied Sciences and Technology, 2020.

Sibi P., Analysis of Different Activation Functions Using Back-Propagation Neural Networks, Journal of Theoretical and Applied Information Technology, vol. 47. No. 3., Jan. 31, 2013.

Zhang et al., "Building HVAC Scheduling Using Reinforcement Learning via Neural Network Based Model Approximation", BuildSys '19, pp. 287-296 (Year: 2019).

Huang, et al., (Reachnn: Reachability analysis of neural-network controlled systems. ACM Transactions on Embedded Computing Systems (TECS) 18.5s (2019): 1-22) (Year:2019).

An et al., "IC neuron: An efficient unit to construct neural netoworks". (Year:2020).

Biswas et a.l ("Prediction of residential building energy consumption: Aneural network approach" Energy 17 (2016) 84-92.) (Year: 2016).

Afroz, Zakia, et al. "Real-time prediction model for indoor temperature in a commercial building." Applied energy 231 (2018): 29-53. (Year: 2018).

Elsheikh AH, Sharshir SW, Abd Elaziz M, Kabeel AE, Guilan W, Haiou Z. Modeling of solar energy systems using artificial neural network: A comprehensive review. Solar Energy. Mar. 1, 2019;180:622-39. (Year: 2019).

* cited by examiner

100

300

200

High level inputs and outputs of models

Fig. F4

NEURAL NETWORK METHODS FOR DEFINING SYSTEM TOPOLOGY

RELATED APPLICATION

The present application hereby incorporates by reference the entirety of, and claims priority to, U.S. provisional patent application Ser. No. 62/704,976 filed 5 Jun. 2020.

FIELD

The present disclosure relates to neural network methods for describing system topologies. More specifically the present disclosure relates to creating thermodynamic models of spaces with same-length neuron strings.

BACKGROUND

Deep learning artificial neural nets are generally built with neurons with weight and connections. The neurons are arranged into an input layer, one or more hidden layers, and an output layer. The neural net learns by having training sets fed into the input neurons; the information flows through the hidden layers to the outputs, where it is then analyzed. Then, based on how different the output at each location is from the desired results, and how output neurons are affecting the input neurons, the weights and connections within the neural network are modified. Once an artificial neural net has been sufficiently trained, it can work surprisingly well for many types of problems, including speech recognition, object identification, game playing, pattern recognition, and so on.

However, the hidden layers are well and truly hidden. This "outside-the-box-looking-in" approach can provide information, but when results are not as expected it is very difficult to troubleshoot, as how the answers are arrived at are shrouded in darkness. Looking at the weights and measures of a trained neural net shows no discernible relationship between the input and the output. So, correctly designing and training artificial neural networks relies on the administrator having a great deal of knowledge about the system to understand the problem to be able to infer what might possibly be happening. Even then, if there are unexpected results, figuring out why can be close to unsolvable. This problem is amplified when attempting to model buildings, as the various layers of material in a building behave differently and affect each other in difficult-to-anticipate ways, so it is difficult to even tell if the results are unexpected, let alone incorrect.

Trying to model buildings quickly runs into problems, as even simple buildings are very complex in terms of the current controllers that are used to manage the systems in buildings. Proportional-Integral-Derivative controllers (PID controllers)—originally designed for ship steering in 1922—are widely used to control HVAC and other systems in building, but fit very poorly into creating models that have more than a single setpoint. To model a room thermodynamically, you would need roughly 50 PID controllers; why so many? The walls are made of multiple materials that transfer state differently, and there are four walls, typically; the ceiling and floor are made of different levels of materials, forces act on the outside of the walls; there are heat sources, such as people and lights in the room, all of which together make up the building. Trying to model all those PIDs for a single room is very difficult. Using such methods to model an entire building quickly becomes close to computationally impossible, both because of the complexity of all the interactions, and because of the huge amount of computer time that would be required. Using a traditional neural network to model all the individual portions of a building would take an absurd time to run, and would require an unreasonable number of training sets.

SUMMARY

This summary is provided to introduce a selection of concepts in a simplified form that are further described below in the Detailed Description section. This summary does not identify required or essential features of the claimed subject matter.

In general, one innovative embodiment comprises a neuron model creation system. This system comprises at least one processor, a memory in operable communication with the processor and neural model discretization code residing in memory. The model discretization code comprises an element determiner which determines structure elements for subsystems in a digital representation of a structure. These subsystems may be masses in a structure, such as walls, ceilings and floors. The structure elements may be materials in the masses, such as insulation, cladding material, and so forth. A neuron builder builds a neuron for each structure element in the first subsystem and the second subsystem. These neurons comprise an input, an output, at least one parameter, and a label. Parameter values are added that relate to values in the structure elements. A discretizer builds extra neurons such that subsystem is represented by an equal-length neuron string.

The foregoing and other embodiments can each optionally include one or more of the following features, alone or in combination. In particular, in an illustrative embodiment, a neuron is split into two neurons. This split divides some parameter values in half in the resulting neurons. A neuron concatenator links the neurons together such that information travels along the string.

In an embodiment, the neuron builder builds an inner neuron which comprises representation of state within the structure, and which is concatenated to a neuron string. In an embodiment, inner neurons and outer neurons can be attached to each end of a neuron string. Ground neurons and inner air neurons which represent state of the ground and state of air can also added to neuron strings.

In an embodiment, a neural network with two rooms is described. A set of neuron strings can be associated with each room. A wall is shared between the two rooms in the structure represented by the neural strings. The wall can be represented by a single wall string in the set of neuron strings associated with the first room. An inner neuron associated with the second room can be attached to the string representing the shared wall in the first room.

Additional features and advantages will become apparent from the following detailed description of illustrated embodiments, which proceeds with reference to accompanying drawings.

DETAILED DESCRIPTION

Disclosed below are representative embodiments of methods, computer-readable media, and systems having particular applicability to systems and methods for building neural networks that describe physical structures. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

Figure 1:
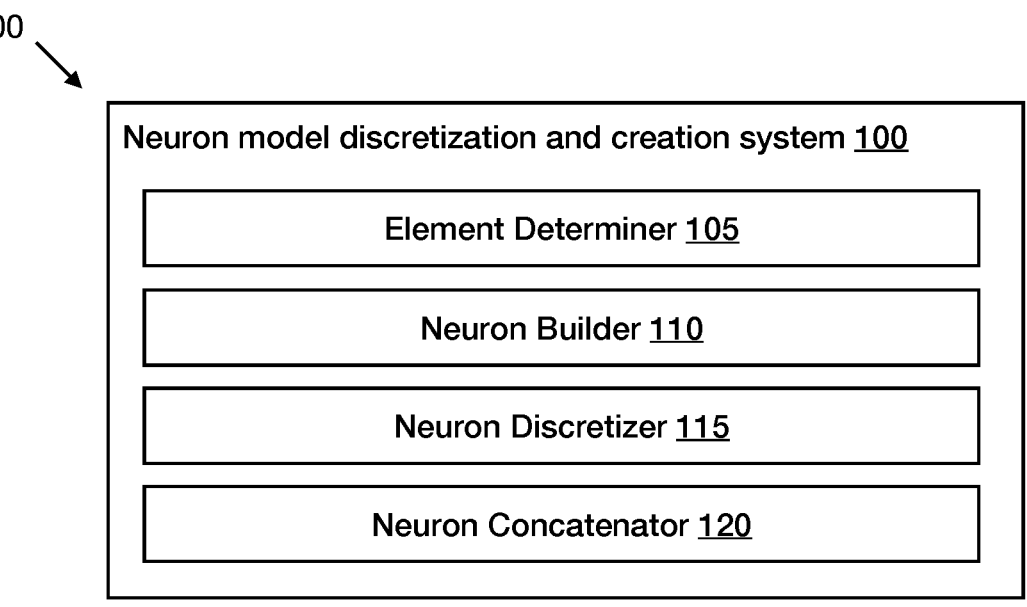
FIG. 1 is a functional block diagram showing an exemplary embodiment of a neuron model discretization and creation system in conjunction which described embodiments can be implemented.

In an exemplary environment, a neuron model system comprises neurons that represent individual material layers of a building and various values, such as their resistance and capacitance. These neurons are formed into parallel and branchless neural network strings that propagate heat (or other state values) through them. With reference to FIG. 1, an embodiment of the neuron model discretization and creation system 100 is shown. Process block 105 shows an element determiner. This element determiner 105 determines structure elements for at least a first subsystem and a second subsystem in a digital representation of a structure. When a digital representation of a building is input into an automation system, the component portions of the building that have different thermodynamic qualities are generally defined. These (for an embodiment), may be broken down, in decreasing complexity, into building, floor, zone, surface, layer, and materials. Layers are composed of materials, surfaces are composed of layers, and so on. Structure elements are these component portions of the building.

Which specific component portions of the building are used depends on the implementation model. Some models may be at a very high level, and so may have structure elements that are composed of floors, for example. Other models may be at a very low level, and so may use structure elements at the materials level. Other models may choose structure elements from different levels, such as some structure elements at a layer level, while other structure elements are at a material level. Other choices are possible as well.

Some structures comprise multiple zones (such as rooms or specific areas monitored by a sensor). Each separate zone may be modeled by its own neural model. The collection of neural models can comprise the thermodynamic model of the structure. In such a multiple zone model, when zones share a surface, such as (in a building implementation), a wall, a floor, or a ceiling, the outside neuron of one neural model may be used as the inner neuron of the next. Some zones may overlap with other zones, while some zones do not. The entire structure may be covered in zones, or some locations within a structure may have no explicit zone. Defined spaces may be defined into multiple subsystems. Any of these portioned defined spaces may be used as the subsystems.

In some embodiments, a structure is a defined space. That defined space may be a building, a portion of a building, a room, a portion of a room, an outside area such as a garden, and so on. This may be a space that currently exists, or may be a space that exists only as a design.

Process block 110 shows a neuron builder. This builder builds a neuron for each structure element in the first subsystem and the second subsystem, each neuron comprising: an input, an output, a parameter, and a label.

Process block 115 shows a neuron discretizer that builds extra neurons for each subsystem that has fewer structure elements that a subsystem with greatest number of structure elements, such that each subsystem has equal number of structure elements. Process block 120 shows a neuron concatenator. The neuron concatenator concatenates the neurons associated with the first subsystem making a first neuron string; and concatenates the neurons associated with the second subsystem making a second neuron string. The neurons are concatenated such that data is operationally able to be transferred along the concatenated neuron string.

II. Exemplary System for Discretation and Creation of Neuron Models

Figure 2:
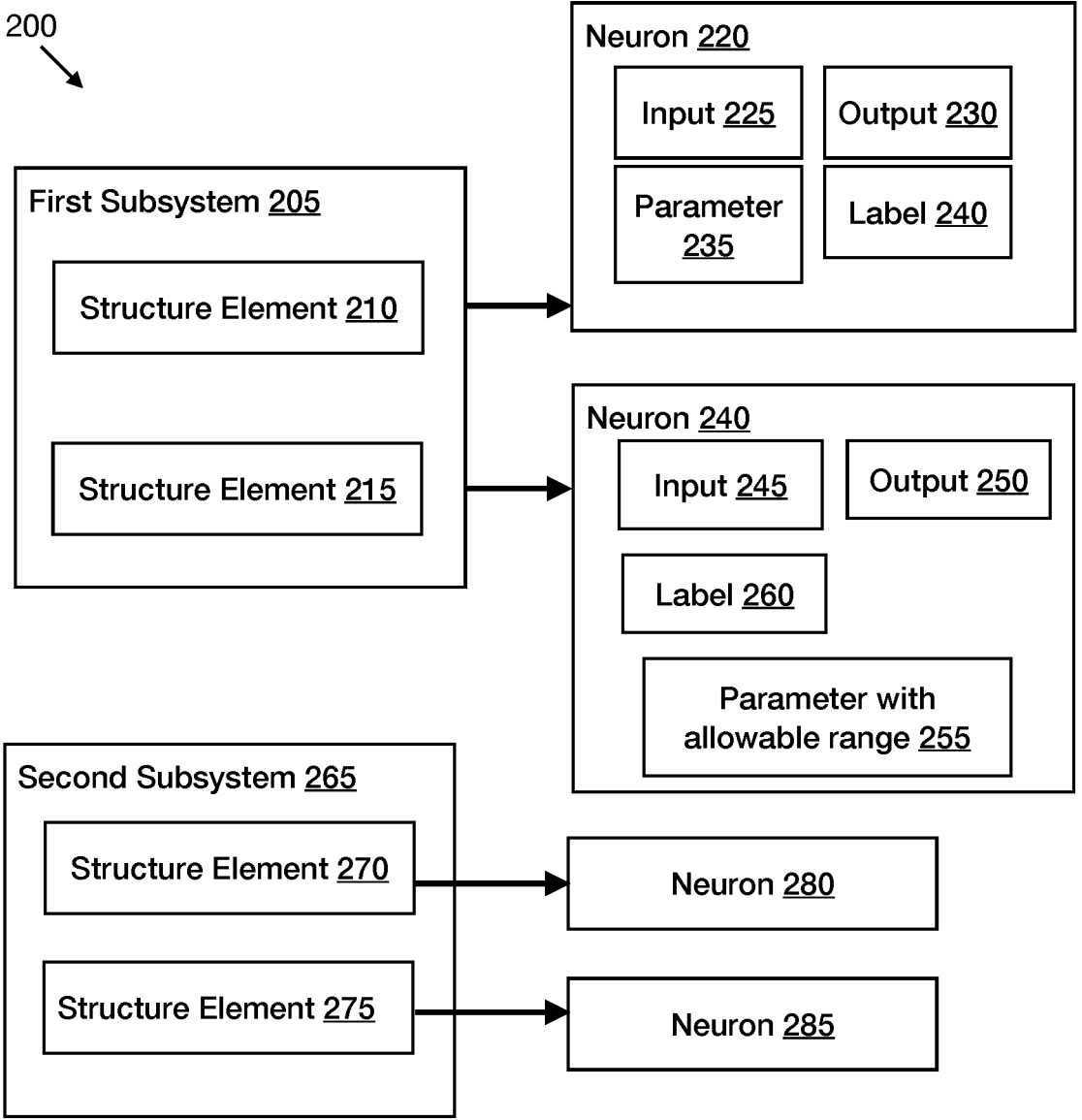
FIG. 2 is a functional block diagram showing an exemplary embodiment of subsystems and neurons in conjunction which described embodiments can be implemented.

FIG. 2 at 200 shows an exemplary embodiment that can be used to create and discretize a neuron model system. A neuron builder 110 builds a neuron for each structure element in a first subsystem 205 and a second subsystem 265. Each subsystem comprises structure elements 210, 215, 270, 275. The structure elements comprise neurons 220, 240, 280, 285. The neurons 220, 240 comprise an input 225, 245, an output 230, 250, a parameter 235, 255, and a label 240, 260. Some parameters 255 may have an allowable range. In such cases, the values allowed to be held within that parameter are constrained in some way. The constraint is any that may be understood by one of skill in the art, such as only certain values are allowed, values between two values are allowed, only whole numbers are allowed, values greater or lesser than a certain value are allowed, and so forth. Other implementations include other parameters, or lack some of these parameters. In some implementations, neurons have key values that are used to look up multiple values in a database. In some implementations, neuron parameters represent equipment parameters, with some of the parameters having an allowable range of values. These parameters may be parameters of a function, and the function may be a thermodynamic function, such as a physics equation.

Figure 13:
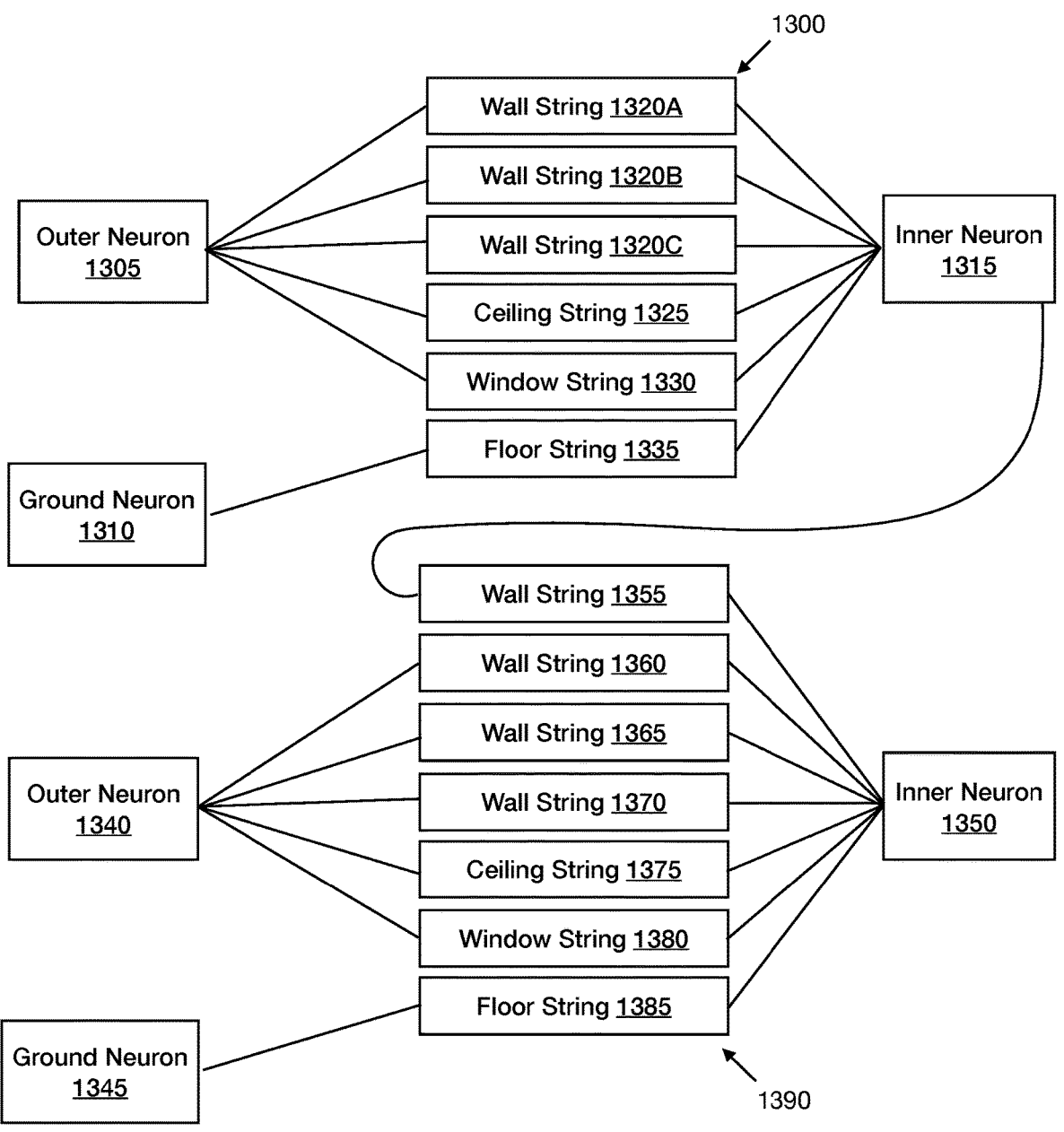
FIG. 13 is a functional block diagram that illustrates an exemplary group of neuron strings that represent zones with a shared wall in conjunction with which described embodiments can be implemented.

As a brief overview, a structure is deconstructed into major masses, such as windows, floors, ceiling, and the like. Each of these major masses is further deconstructed into physical structural elements such as outside covering (such as wood), insulation, inside wall surface (such as drywall), etc, as shown with reference to FIG. 4. The major masses are then represented within the neural net as subsystems, as shown at FIG. 5, with reference to 530, 555, 570; which are turned into neuron strings, as shown with reference to FIG. 7, which themselves are grouped into neural net sets, as shown in FIG. 13.

Figure 3:
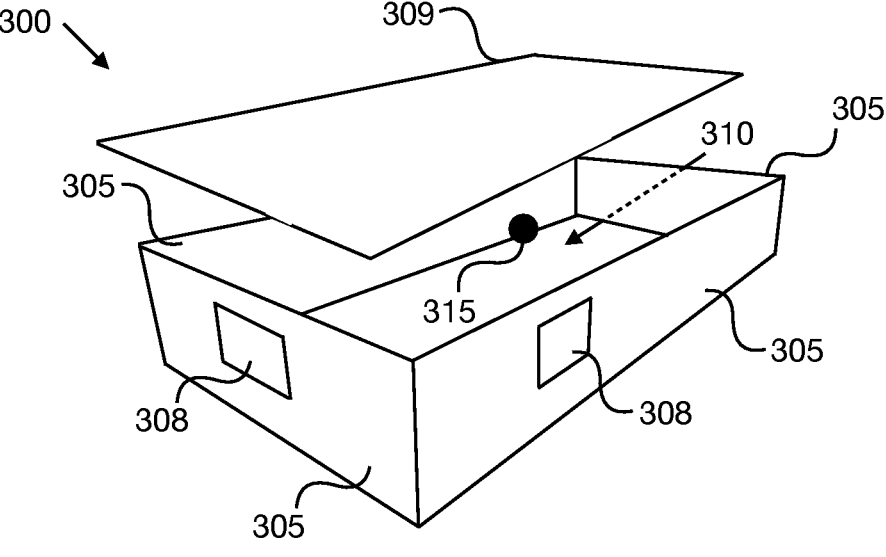
FIG. 3 is a diagram showing an exemplary embodiment of a structure in conjunction with which described embodiments can be implemented.

With reference to FIG. 3, in an illustrative embodiment, a structure 300 is shown. The component portions of a building (in this case) that have different thermodynamic qualities are generally defined. These (for an embodiment), may be broken down, in decreasing complexity, into building, floor, zone, surface, layer, and materials. Layers are composed of materials, surfaces are composed of layers, and so on. In some embodiments rather than using the entire structure, the structure space is disaggregated, and then the state space is reduced by using relevant parts of system.

In an exemplary example, a model is built to represent a structure 300 comprising a single zone, or room. The model comprises the main thermodynamic masses (or thermal masses) in the space, e.g., four walls 305, windows on outside walls 308, a floor 310, and ceiling 309. An additional mass 315 represents properties within the zone, such as air. These major masses have separate thermodynamic qualities.

Figure 4:
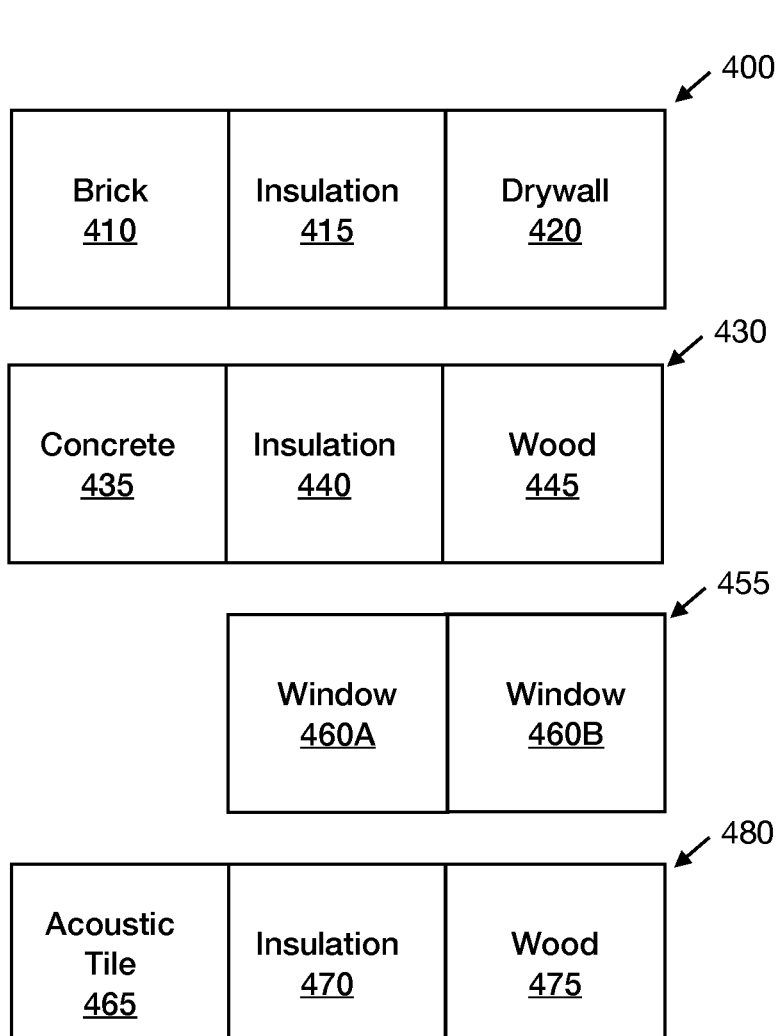
FIG. 4 is a functional block diagram illustrating an embodiment of different structural representations with which described embodiments can be implemented.
Figure 5:
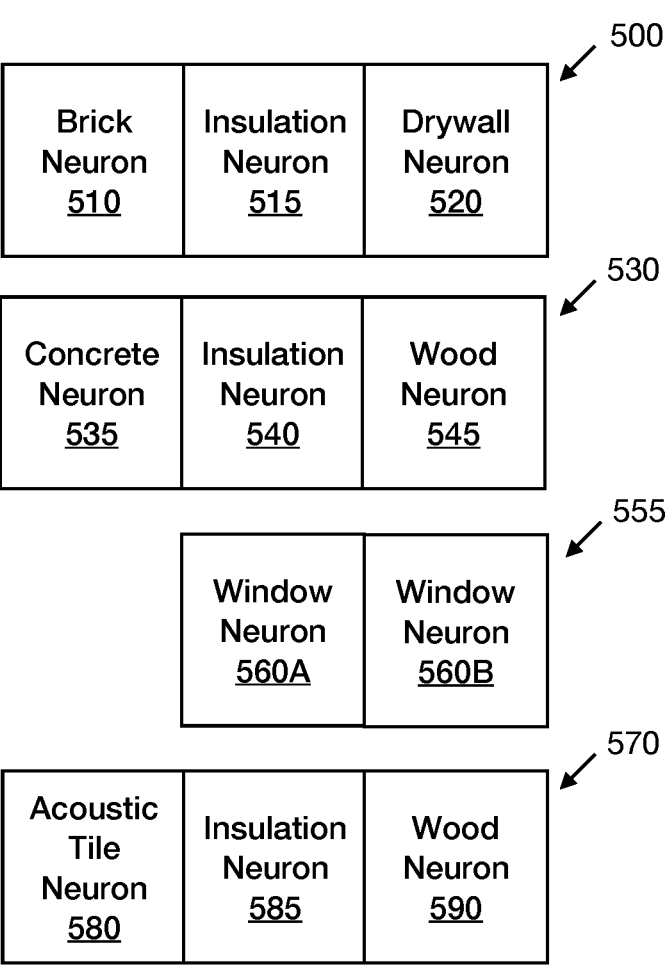
FIG. 5 is a functional block diagram illustrating an embodiment of example neurons in conjunction with which described embodiments can be implemented.

With reference to FIG. 4, the different masses of the building 300 are shown. Walls 400 comprise a brick layer 410, an insulation layer 415, and drywall 420. The floor 430 has a concrete layer 435, an insulation layer 440, and a wood layer 445. In this embodiment, rather than being included in the wall layer, both windows 455 are represented as a window layer 455 with two windows 460A and 460B. The ceiling has an acoustic tile layer 465, an insulation layer, and a wood layer 475. Similarly named layers may have different properties, represented by different parameter values. For example, the insulation layers 415, 440, and 470 may all have different properties.

These different layers and their properties of the system shown in FIG. 4 are used to create an artificial neural network. With continuing reference to FIG. 1, an element determiner 105 determines structure elements for at least a first subsystem and a second subsystem in a digital representation of a structure. With reference to FIG. 5, and continuing reference to FIG. 2, neurons are built that represent the physical layers (or other hierarchical elements) of a structure, e.g., 300. Creating these neurons comprises giving parameter (or parameters) associated with various types of material values that represent the thermodynamic properties of such material to the neurons. The neurons may also be given other properties of the physical layer, such as thickness.

A first subsystem 205 may be neurons 500 that represent the outer walls 305. These could comprise a brick neuron 510, insulation neuron 515, and a drywall neuron 520, built with reference to the structure elements 410, 415, and 420. In this embodiment, the wall 305 contain a window 308, but the wall string 500 ignores the window 308. The window has a separate element 455 which gives rise to a separate neuron string 555, discussed later.

Similarly, a second subsystem 265 may be a digital representation of the floor 310, built in reference to structure elements 435, 440, and 445, and shown at 530 with a concrete neuron 535, an insulation neuron 540, and a wood neuron 545.

The windows 308, 455 make up a further subsystem and comprise the window neurons 460A and 460B, which are built to represent the two windows 308. Windows may also be represented by a number of different layers, such as by assigning different panes in the window to different neurons with different values. The windows within a structure or zone may be then grouped together to form an all-window set of neurons 555, with a given neuron representing a given window—that is, having parameter values that reflect that window's thermodynamic behavior. Other material than windows may also be grouped together to form their own set of neurons.

The ceiling subsystem 309, 480 has an acoustic tile neuron 580, an insulation neuron 470, 585, and a wood neuron 590 that are built with regard to structural elements 465, 470, and 475. Each separate neuron may have different parameters representing different properties of the materials in the structure 300. For example, the insulation neurons 415, 440, and 470 may all have different parameter values representing different properties of the different type of insulation (that is to be) used in each location.

With continuing reference to FIG. 1, Process block 115 shows a neuron discretizer that builds extra neurons for each subsystem that has fewer structure elements that a subsystem with greatest number of structure elements, such that each subsystem has equal number of structure elements.

Figure 5A:
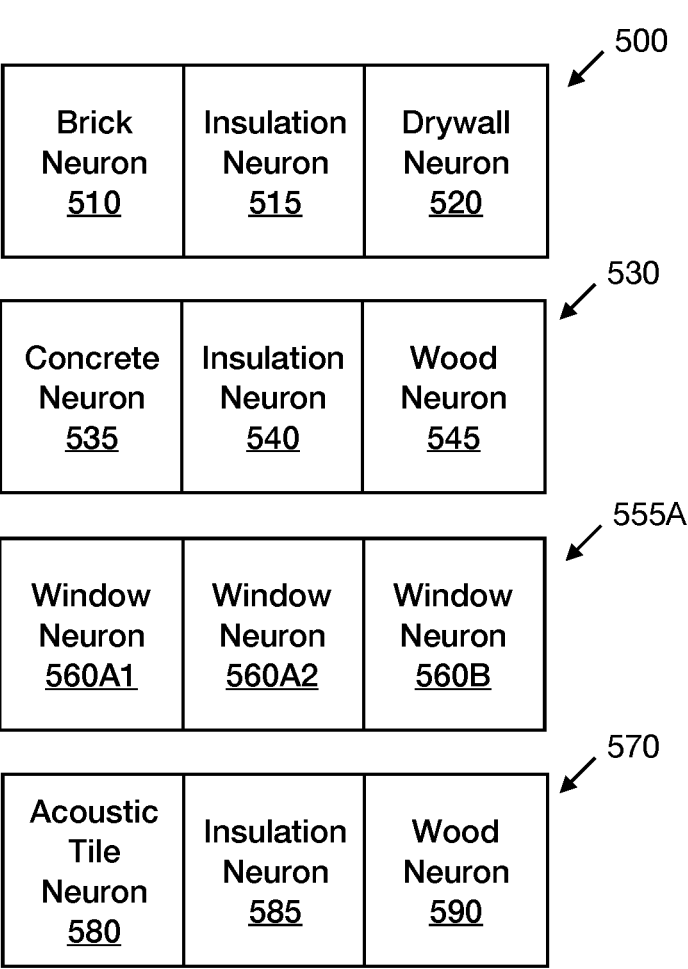
FIG. 5A is a functional block diagram that is a refinement of FIG. 5, illustrating an embodiment of split neurons in conjunction with which described embodiments can be implemented.

FIG. 5A shows an illustrative embodiment of this process in greater detail. The subsystem with the greatest number of neurons is determined. Then, each subsystem with fewer neurons will have neurons added until each subsystem has an equal number of neurons. Wall neuron subsystem 500, floor neuron subsystem 530, and ceiling neuron subsystem 570 all have three neurons. However window neuron subsystem 555 has only two neurons. Therefore, the window neuron subsystem will replace the original neuron 560A with two neurons, 560A1 and 560A2 creating the neuron subsystem 555A. Window Neuron 560B remains the same.

In some embodiments, to create a new neuron, a neurons are split, with each split neuron being given a fractional values such that the duplicated neurons plus the original neuron all together have the same value as the original neuron. A neuron that is split into two will have values in both new neurons that are one-half the value of the original neuron; a neuron that is split into four will have values that are one-fourth the original value, and so forth.

Figure 6:
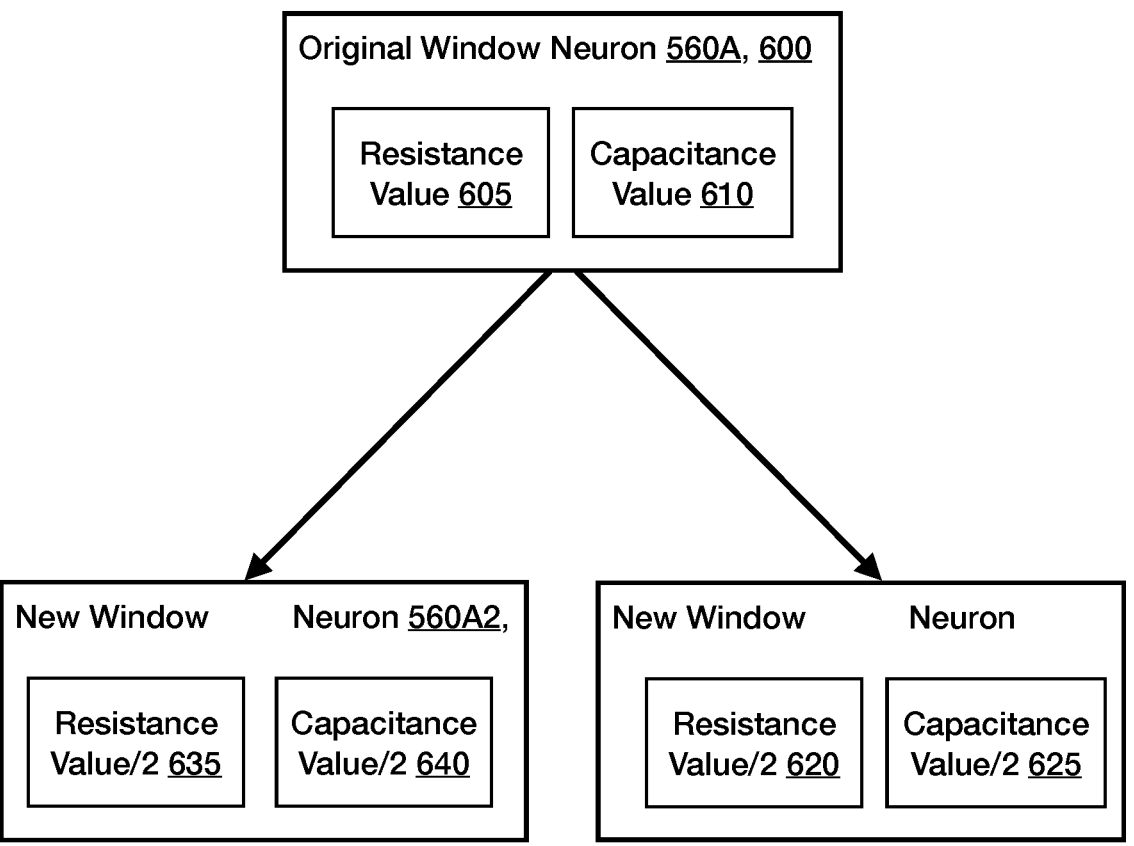
FIG. 6 is a functional block diagram illustrating an exemplary embodiment of splitting neurons with which described embodiments can be implemented.

An example embodiment of split neurons is shown in FIG. 6. An original neuron 600, such as the window neuron 560A is shown. It comprises two parameters (such as parameter 235 in FIG. 2), that will be modified during the splitting. These two parameters hold, e.g., a resistance value 605 and a capacitance value 610. This neuron is split into two neurons 560A1, 615, and 560A2, 630. Each of these new neurons resistance value 620, 635 is given ½ of the of the resistance value 605 of the original neuron 600. Adding up the resistance value of 620, and 635 will give the value of the original neuron's resistance value 605. Each of these new neurons capacitance value 625, 640 also is given ½ of the of the original capacitance value 610 of the original neuron 600. These new capacitance values 625, 640 will add up to the original neuron capacitance value 610. Each new neuron may also have parameter values (such as input and output, shown at FIG. 2 at 225 and 230) which may be changed, such that the inputs and outputs are connected so that one neuron's input is the next neuron's output, as discussed with reference to concatenation. Some split neurons may have parameter values that are not changed.

Figure 8:
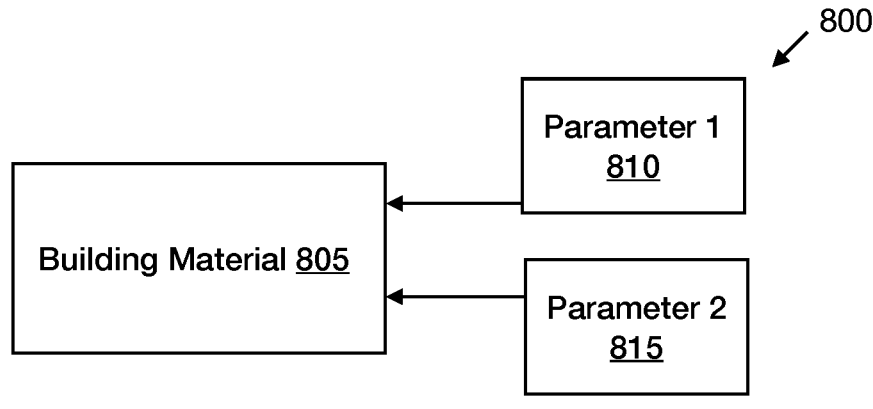
FIG. 8 is a functional block diagram illustrating an exemplary embodiment of the relationship between materials and parameters in conjunction with which described embodiments can be implemented.

In an embodiment, to determine which neuron to split, two parameter values are multiplied together in the neuron's subsystem to produce a split value for each neuron. The neuron with the highest split value will be the one that is split. With reference to FIG. 8, values in the neurons are determined by values in the materials the neurons are representing, as shown at 800. A building material 805 has various values associated with it, such as Parameter 1 810, and Parameter 2, 815. One or more of these material parameters, or a function of these parameters, are passed on to the neurons associated with these materials. So, a specific insulation material will have parameters associated with it that will then be reflected in values in the neurons that represent that specific insulation layer. With reference to FIG. 6, A representative neuron 600 has two parameters shown, a resistance parameter 605 and a capacitance parameter 610. In this embodiment, the resistance parameter 605 value and the capacitance value 610 will be multiplied together, producing a split value. This will be done for each neuron in a subsystem, such as the wall subsystem 500. The neuron associated with the largest split value is then split as described above.

Figure 7:
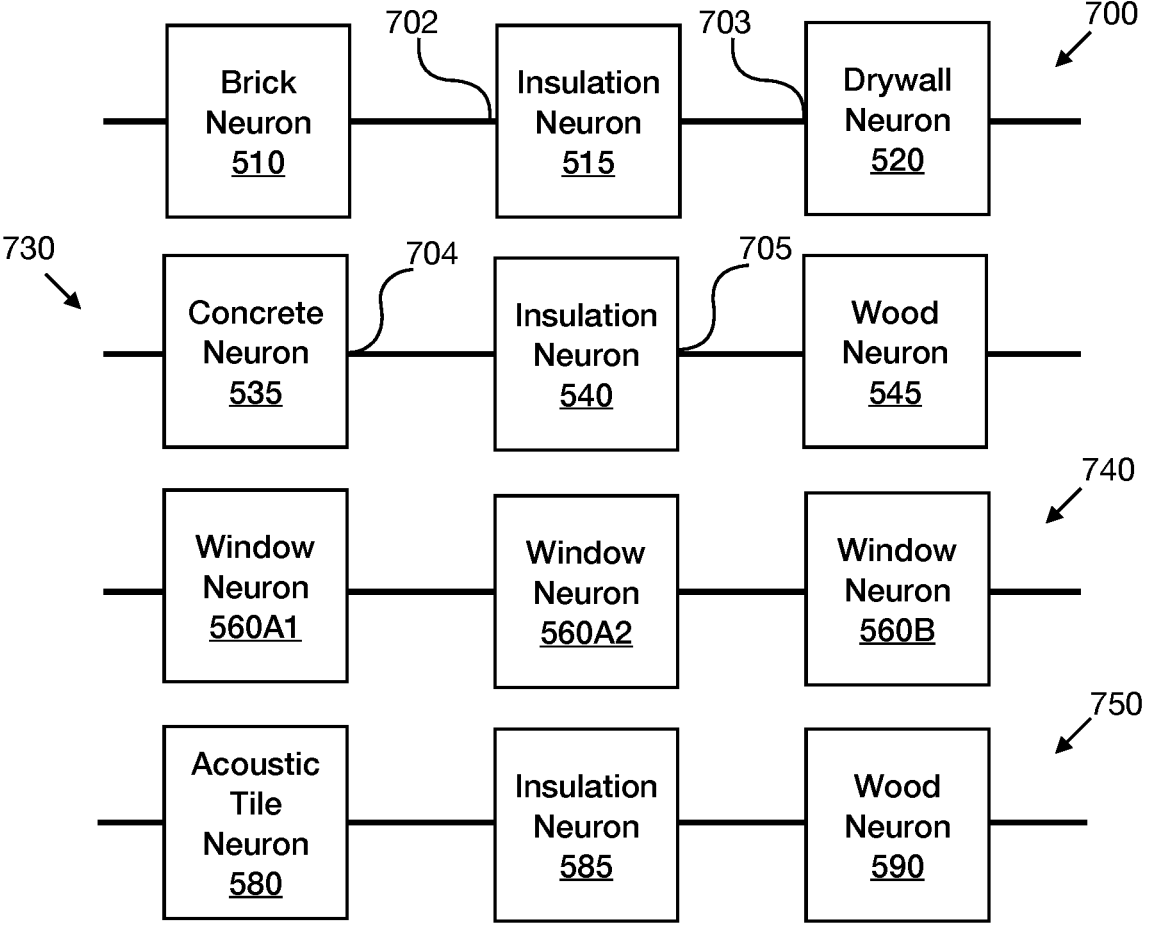
FIG. 7 is a functional block diagram illustrating an exemplary embodiment of concatenated neurons in conjunction with which described embodiments can be implemented.

Once the neurons are split (if necessary), the neurons are concatenated such that neurons associated with the first subsystem make a first neuron string, as can be seen with reference to FIG. 7 at 700. The neurons associated with the second subsystem are also concatenated making a second neuron string 730. This comprises the input of each next one of the neurons in a neuron string being connected to the output of a preceding one of the neurons, such that data is operationally able to be transferred along the concatenated neuron string. As an example, the set of wall neurons 700 are linked together in a series such that the brick neuron 510 is linked 702 to the insulation neuron 515, which is linked 703 to drywall neuron 520. Similarly, the floor neurons 730 are linked such that concrete neuron 535 is linked 704 to insulation neuron 540, which is linked 705 to wood neuron 545. Window neurons 740 and ceiling neurons 750 are also linked together, forming their own neuron strings.

As to how the neurons are linked, with reference to FIG. 2, an illustrative neuron 220 shows an input 225 and an output 230. The output 230 of the brick neuron 510 is set to the insulation neuron 515; the input of the insulation neuron 515 is set to the brick neuron 510; the output of the insulation neuron is set to the drywall neuron 520. These concatenated neurons 700 make a first neuron string. The concatenated neurons 730 make a second neuron string. Those of skill in the art will recognize that there are other equally valid ways to concatenate neurons all of which are covered herein.

Figure 10:
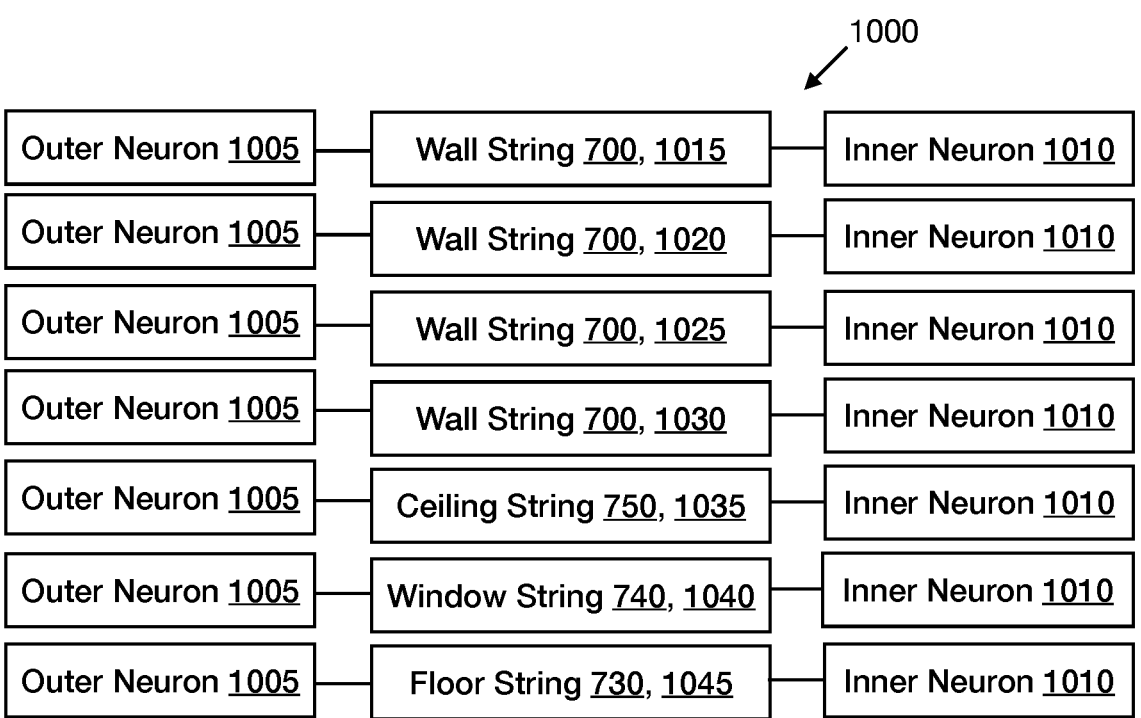
FIG. 10 is a functional block diagram that illustrates an exemplary group of neuron strings with inner and outer neurons in conjunction with which described embodiments can be implemented.

With reference to FIG. 10, and continuing reference to FIG. 3, a neural string set 1015, 1020, 1025, 1030, 1035, 1040, 1045, representing the structure 300 is shown. Notice that the illustrative structure 300 has four identical walls 305 aside from window placement. Each wall 500 will have its own neuron string, for a total of four wall strings in a neural string set representing the structure 300, as shown in FIG. 10 at 1015, 1020, 1025, and 1030. These neural strings shown are simplified for clarity. For example, the wall string 1015 can be seen with more detail in FIG. 7 at 700.

In an illustrative embodiment, the neuron builder builds an inner neuron 1010 which comprises representation of state within the structure, such as shown at 315 in FIG. 3. The inner neuron is concatenated to the first neuron string, using systems and methods as have been explained, e.g., with reference to FIG. 7.

Figure 9:
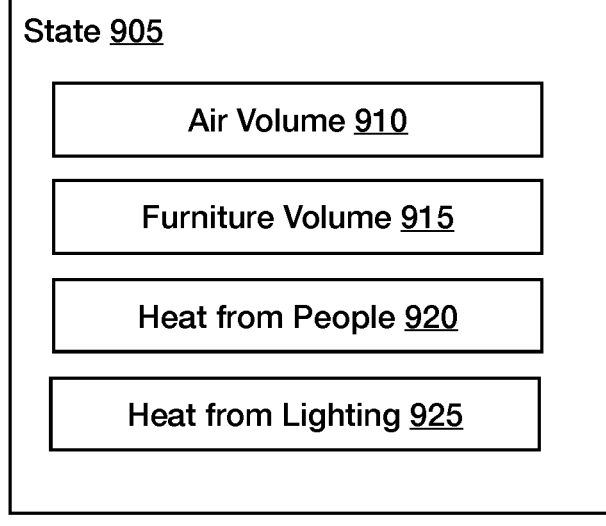
FIG. 9 is a functional block diagram illustrating an exemplary embodiment of state parameters in conjunction with which described embodiments can be implemented.

With reference to FIG. 9, the inner neuron may comprise parameter (or state 905) values that are a combination of one or more of air volume in the inside of the structure 910 (or zone within the structure), furniture volume 915, heat associated with people in the structure 920, heat associated with lighting in the structure 925, other state modifiers within the space, temperature, roughness of surfaces, or angle of surfaces. In the illustrative embodiment, identical inner neurons 1010 are concatenated to each neuron string in the neural string set. Other embodiments have different inner neurons connected to different neural strings within the neural string set.

In an exemplary embodiment, the neuron strings making up the neuron string set 1000 are all the same length. This allows them to be run in parallel on a vector processor, greatly speeding up execution time. In another embodiment, some of the neuron strings in a neuron string set are the same length, such that that portion of the neuron string set can be run on a vector processor.

In an illustrative embodiment, with reference to FIG. 10, the neuron builder builds an outer neuron 1005, which comprises representation of state outside the structure. A "state" as used herein and throughout, may be Air Temperature, Radiant Temperature, Atmospheric Pressure, Sound Pressure, Occupancy Amount, Indoor Air Quality, $CO_2$ concentration, Light Intensity, or another state that can be measured and controlled.

The outer neuron is concatenated to the first neuron string, using systems and methods as have been explained, e.g., with reference to FIG. 7. The outer neuron may comprise parameter values that are a combination of one or more of outside temperature, wind speed, wind angle, roughness of outside surfaces, etc. The outer neuron 1005 may be concatenated to all strings within a string set (that represents a room or a zone, etc.) that are at the boundary between the structure and the outside air. Different orientation of the building may result in different parameter values for some outer neurons. Some embodiments may use different outer neurons in some locations.

III. Exemplary Method for Discretization and Creation of Neuron Models

Figure 11:
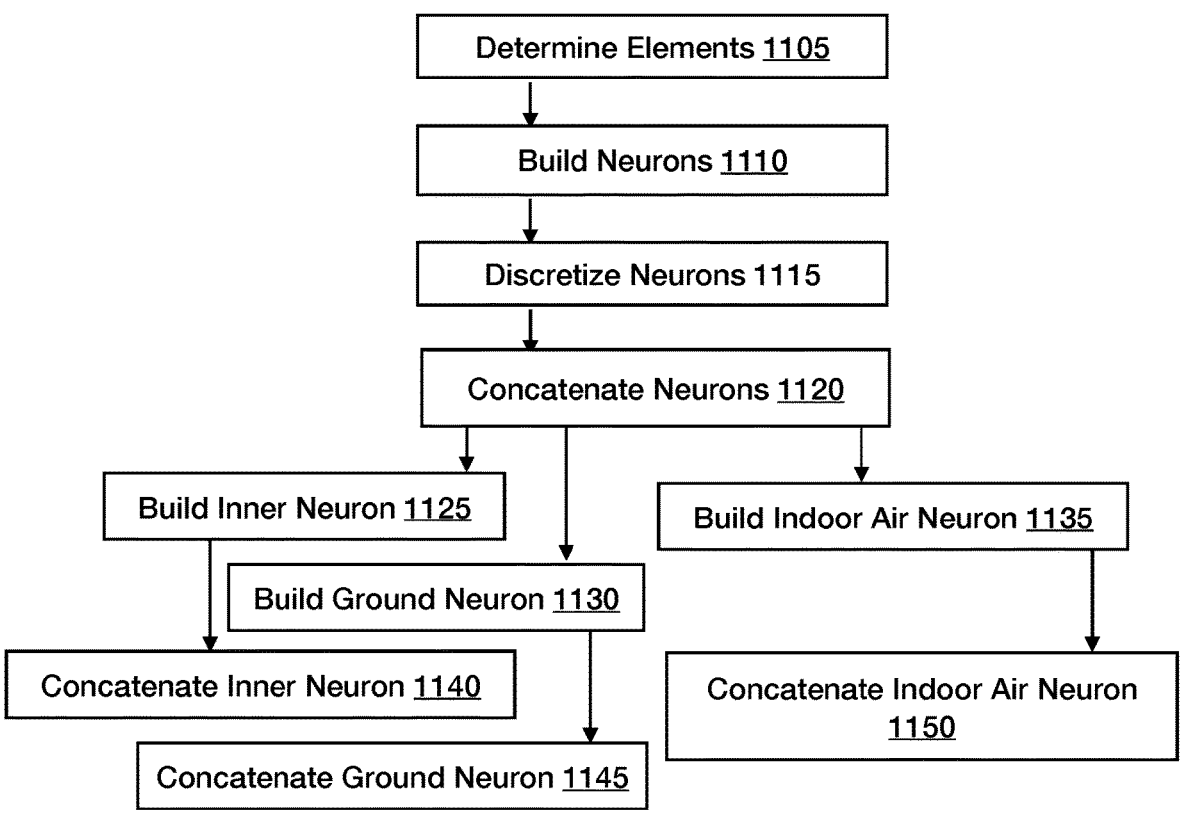
FIG. 11 is an operational flow diagram showing an exemplary neural network creation and discretization method.

With reference to FIG. 11, an exemplary method for discretion and creation of neuron models is described. At 1105, structure elements are determined for at least a first subsystem and a second subsystem in a digital representation of a structure. This is described in more detail at. e.g., FIGS. 2, 3, and 4, and the text associated therewith. At 1110, a neuron is built for each structure element in the first subsystem and the second subsystem. This is discussed in more detail at. e.g., FIGS. 2 and 5. Each neuron comprises an input, an output, a parameter, and a label. This is discussed at, e.g., FIG. 2, FIGS. 8-9, and throughout. At 1115, a neuron discretizer builds extra neurons for each subsystem that has fewer structure elements that a subsystem with greatest number of structure elements, such that each subsystem has equal number of structure elements. This is described in more detail with reference to FIGS. 5, 5A, and 6 and the text associated therewith.

At 1120, the neurons associated with the first subsystem are concatenated, making a first neuron string. The neurons associated with the second subsystem are also concatenated, making a second neuron string. The input of each next one of the neurons in a neuron string is connected to the output of a preceding neurons such that data is operationally able to be transferred along the concatenated neuron string. This is described in more detail with reference to FIGS. 7, 8, and 9, and with reference to the associated text.

Figure 14:
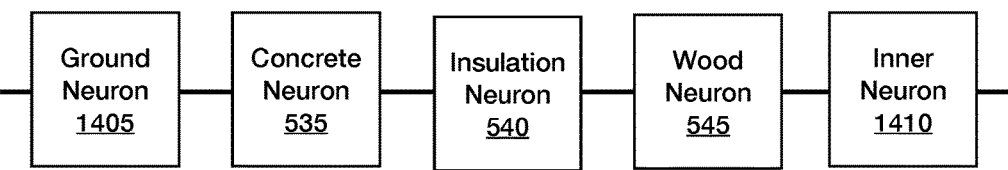
FIG. 14 is a functional block diagram that illustrates an exemplary neuron string with a ground neuron in conjunction with which described embodiments can be implemented.

At 1125, an inner neuron is built. This is described in more detail with reference to FIG. 10 and the associated text therein. At process block 1130, an outside neuron is built. Here, an outside neuron is equivalent to an outer neuron. This is described in more detail with reference to FIG. 10 and the associated text therein. At 1140, the inner neuron is concatenated to a neuron string. In an exemplary embodiment, the inner neuron is concatenated to a neuron whose structure element touches inside air, that is, an interior surface neuron. With reference to FIG. 14, the inner neuron 1410 is concatenated to the interior surface wood neuron 545.

At 1130, a ground neuron is built. With reference to FIG. 13, a ground neuron 1310 comprises state changes from the ground that affect surfaces touching the ground. These may include ground temperature, and resistance and capacitance value representing energy transferred from the ground to the surface materials touching the ground. As such, the ground neuron is concatenated to a neuron whose physical analog to a structure element touches the ground. At 1145, the ground neuron 1310 is concatenated to an existing neuron string

1315. In the illustrative example, with reference to FIG. 7. the floor string 730 is concatenated to the ground neuron 1310 prior to the concrete neuron, as seen in FIG. 14 at 1405, with the ground neuron 1405 being concatenated to the concrete neuron 535.

At 1135, an indoor air neuron is built. This indoor air neuron comprises physical qualities of the air inside a space/room. With reference to FIG. 9, the indoor air neuron may comprise state values such as air volume 910, furniture volume 915, heat from people 920, or heat from lighting.

Figure 15:
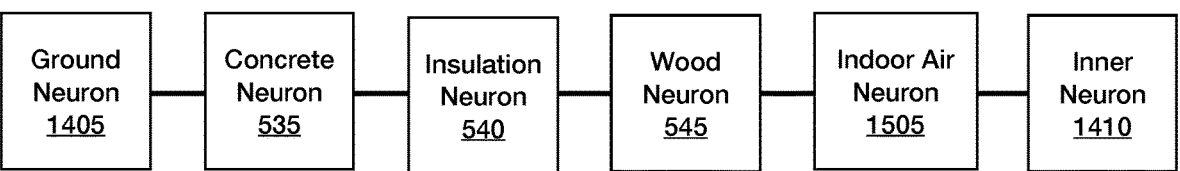
FIG. 15 is a functional block diagram that illustrates an exemplary neuron string with an indoor air neuron in conjunction with which described embodiments can be implemented.

At 1150 the indoor air neuron is concatenated to an existing neuron string. The indoor air neuron is attached between an interior surface neuron and an inner neuron. With reference to FIG. 15, in an illustrative embodiment, the indoor air neuron 1505 is attached between the inner neuron 1415 and the wood neuron 545.

Figure 12:
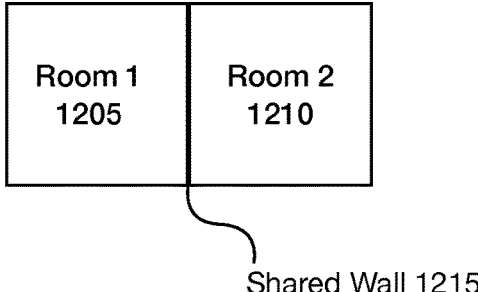
FIG. 12 is a functional block diagram that illustrates an exemplary set of zones that share a wall in conjunction with which described embodiments can be implemented.

IV. Exemplary System that Comprises Creating Neuron Strings for Multiple Rooms In some embodiments, the digital representation of the structure comprises two or more rooms, and a wall is shared between the rooms. With reference to FIGS. 12 and 13, a structure with two rooms 1205, 1210 is shown that share a wall 1215 between them. A set of neuron strings 1340-1385 is associated with the first room 1205, 1300 and a set of neuron strings 1305-1335 is associated with the second room 1210, 1390. The shared wall 1215 is represented by one wall string 1355 in the set of neuron strings associated with the first room. The wall is represented by no strings in the set of neuron strings associated with the second room, as there are only three neuron strings 1320A, 1320B, 1320C in the neuron string set representing room 2 1210, even though there are four walls, counting the shared wall. The wall string in the neuron string set representing the shared wall 1355 is not attached at the outside end to the outer neuron 1340 for its set as would be expected, but rather is attached to the inner neuron 1315 for room 2 1210. Notice that this shared wall neuron string is also attached at the other, inside end to the expected inner neuron 1350.

Figure 16:
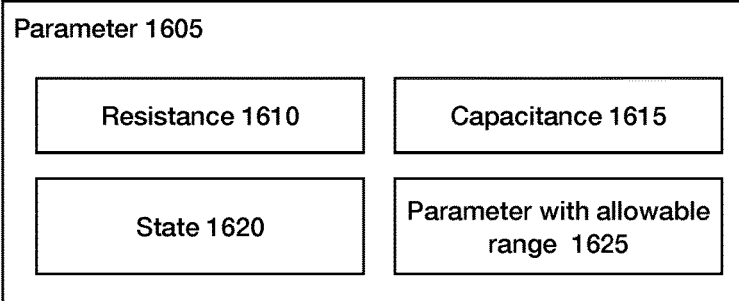
FIG. 16 is a functional block diagram that illustrates exemplary parameter types which described embodiments can be implemented.

With reference to FIG. 16, a neuron can have a variety of parameters 1605. Some of these comprise resistance 1610, capacitance 1615, state 1620, parameters with allowable ranges 1625, and other parameters such as understood by those of skill in the art. These parameters can be queried, allowing information within the thermodynamic model to be determined. In some implementations, all parameters can be queried; in some implementations, only some parameters can be queried. In some implementations one or more of these parameters can be changed.

V. Exemplary Computer-Readable Medium for Creation and Discretization of Neuron Models With reference to FIGS. 11, 17 and 19, some embodiments include a configured computer-readable storage medium 1705. Media 1705 may include disks (magnetic, optical, or otherwise), RAM, EEPROMS or other ROMs, and/or other configurable memory, including computer-readable media (not directed to a manufactured transient phenomenon, such as an electrical, optical, or acoustical signal). The storage medium which is configured may be a removable storage medium 1705 such as a CD, DVD, or flash memory. A general-purpose memory (which may primary, such as RAM, ROM, CMOS, or flash; or may be secondary, such as a CD, a hard drive, an optical disk, or a removable flash drive), can be configured into an embodiment using items such as a neuron builder 1110, 1710 and a neuron concatenator 1120, in the form of data 1980 and instructions 1975, read from a source, such as a removable medium 1705, to form a configured medium. The configured medium 1970 is capable of causing a computer system to perform actions as related herein.

Some embodiments provide or utilize a computer-readable storage medium 1970 configured with software 1985 which upon execution by at least a central processing unit 1910 performs methods and systems described herein. In some embodiments the computer-readable storage medium is implemented in a system with memories 1920, 1940 coupled to one or more processors, such as the central processing unit 1910.

Figure 17:
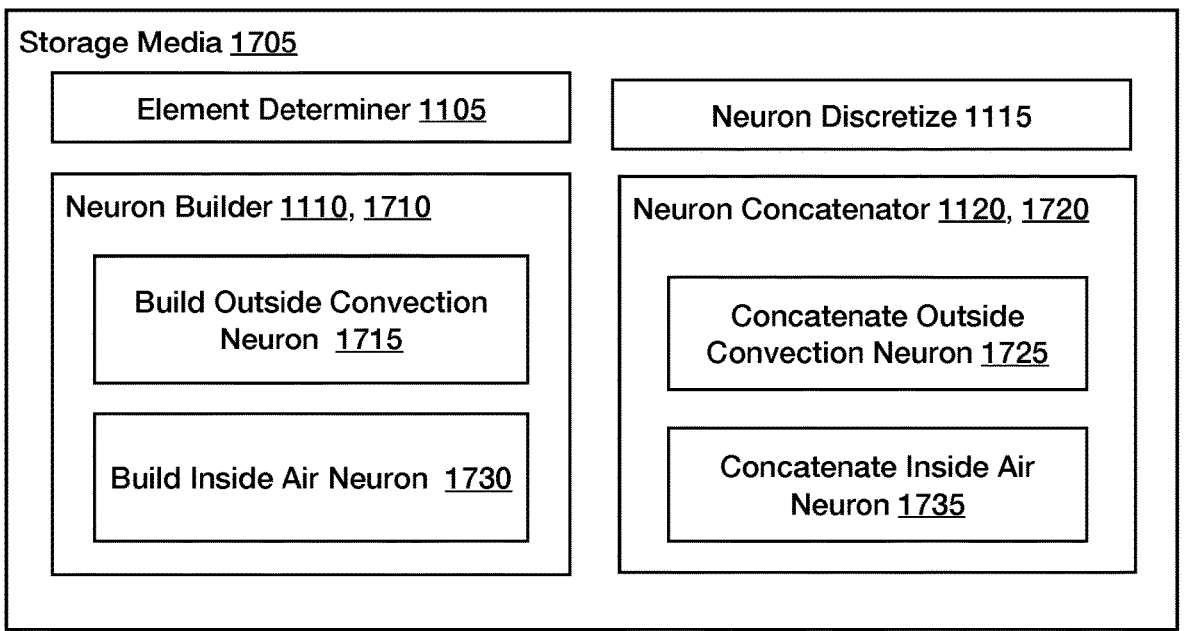
FIG. 17 is a functional block diagram that illustrates exemplary computer storage media with which described embodiments can be implemented.

With continuing reference to FIG. 17, computer-readable storage media 1705 comprise an element determiner 1105 which determines structure elements for at least a first subsystem and a second subsystem in a digital representation of a structure. This is discussed with relation to FIGS. 5, 5A, 6, and 11 and the associated text.

The computer-readable storage media also comprises a neuron builder 1110, 1710 which builds a neuron for each structure element in a first subsystem and a second subsystem, as described with reference to FIGS. 5, 5A, 6, and 11 and associated text.

In an illustrative embodiment, the neuron builder also builds an outside convection neuron 1715. Convection is a type of heat transfer which occurs due to air movement. Thus, it may be modeled in neurons whose physical representations of structure elements touch air. Convection may be calculated as a resistance based on various parameters, such as: temperature difference between air and surface, wind velocity and direction, building geometry, and surface roughness. Exterior convection resistance lies between outdoor air neuron and exterior surface neuron and the interior convection resistance lies between indoor air neuron and interior surface neurons. Convection resistance is variable since it is function of environmental parameters. As such it may be modeled as a runtime value. In some embodiments convection neurons have only a resistance value. In an illustrative embodiment, the neuron builder also builds an inside air neuron 1730. The air neuron comprises the volume of space in a room or structure, the mass of furniture, and/or other factors that affect the air state. The air neuron models air between an interior surface neuron and an inner neuron, and as such is concatenated between an interior surface neuron and an inner neuron.

The computer-readable storage media also comprises a neuron concatenator 1720, which builds a extra neuron for each subsystem that has fewer structure elements that a subsystem with greatest number of structure elements, such that each subsystem has equal number of structure elements; and concatenating the neurons associated with the first subsystem making a first neuron string; and concatenates the neurons associated with the second subsystem making a second neuron string, the input of each next one of the neurons in a neuron string being connected to the output of a preceding one of the neurons, such that data is operationally able to be transferred along the neuron string. This is discussed with reference to FIGS. 5, 5A, 6, 7, and 11 and the related text.

Figure 18:
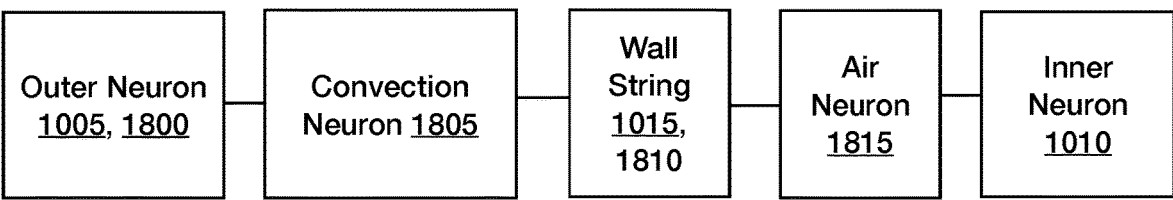
FIG. 18 is a functional block diagram that illustrates an exemplary neuron string with a outer convection neuron in conjunction with which described embodiments can be implemented.

The neuron concatenator also concatenates the outside convection neuron between the outside neuron and the first neuron string 1725. With reference to FIG. 18 at 1800, the outside convection neuron 1805 is placed between an outer neuron and a neuron representing a structure element that faces the outside, such as the outer edge of wall string 1810.

The neuron concatenator also concatenates the inner air neuron between an inner neuron and a neuron that touches inside air 1735. The inner air neuron 1815 is placed between an inner neuron 1010 and the inner edge of wall string 1015, 1810, as it borders the inside air.

Occupancy comfort can be atomized to the comfort of specific humans. Parameters that can be determined on a person-specific level comprise: heat of person, convection, sweat, activity levels, metabolic rate, location, coo (the insulation value of the clothing a person is wearing). In one embodiment, some portion of the building may have a file of person (height, weight). The building may also be able to monitor activity level by, for example accessing a wearable fitness device or a phone associated with someone in the building. Through this information automation processes in the building may be able to infer metabolic rate (met). Using the metabolic rate the automation system may be able to make a good guess as to what temperature (or other states) the person with the wearable fitness device would prefer. A person could also have temperature and other building state preferences on file that the automation system then attempts to meet (within the other competing needs within the building)\

The comfort goal may be used to determine permissible comfort values. It is a number value (such as a value between 0 and 3) that defines how close to absolute comfort we hope the model to get. The comfort goal, in some implementations, gives an allowable error range for the final resource control state curves; a low value may indicate that the comfort curve must be closely matched, while a higher number may indicate that there is more leeway allowed. The values may be reversed, such that a low value indicates a higher tolerance for error, etc.

The desired target path is a possible name for a state curve that models chosen comfort qualities such as temperature. A person (or an object) may have an ideal temperature at 70 degrees, for a specific example. However, how people and objects experience temperature is dependent on more than just the straight temperature. It also depends on, e.g., humidity, air flow, radiant heat, and so on. Different state curves with different values may match the desired target path. For example, higher humidity and lower temperature may be equivalent with state curves modeling lower humidity and higher temperature. The desired target path can also be considered the ground truth.

This target path may take the form of a time series of state values. There may be one time series for each modulatable zone, or there may be more than one time series for a zone; zones may share time series. The building model may model many different state time series simultaneously. Such state time series may be humidity, co2 level, temperature, voc, etc.

One way to model the amount of state is to model one or more modulatable resources that input energy into the simulation model. These resources may model equipment, just general state (eg. heat) moving into the structure, weather, changes to state caused by occupancy; changes to state caused by lighting, and so on. As an example, if a formerly empty 70 degree conference room fills up with 50 bodies in a period of minutes, this extra heat may be accounted for here.

As a brief overview, to optimize this model, we first determine what state values the building should have. A person (or an object) may have an ideal temperature at 70 degrees, for a specific example. However, how people experience temperature is dependent on more than just the straight temperature. It also depends on, e.g., humidity, air flow, radiant heat, and so on. Different state curves with different values may match the desired target path. For example, higher humidity and lower temperature may be equivalent with state curves modeling lower humidity and higher temperature. We combine all of this information to determine time-series comfort curves for the different building zones.

Generally, the model runs by iteratively taking what we want as output, for this example, heat, as input into the simulation model, run for a specified period of time, and outputs a simulated version of what we are using as input. These high level inputs and outputs can be seen in the FIG. 20. At a high level, the output of comfort model, load curves, can be used as input for the building model. The output of the building model, source curves (energy needs per zone), can then be used as input to an equipment model. The output of the equipment model are control curves, which describe an optimal way to run the equipment in the building.

At a specific level, models are run iteratively to optimize values by using the high level output as input and the input as output. So, for example, the building model iteratively runs by choosing a set of values for load curves, running them through the building model, which outputs simulated source curves. These are then checked to see how closely they match the given source curves. The difference between the simulated source curves and the ground truth source curves are checked using a cost function, described elsewhere. Then, using back propagation or something similar, a new set of load curves are chosen that should produce output closer to the given source curves.

The equipment model behaves similarly. The high-level output, control curves, are used as input, the equipment model is run and outputs simulated load curves. These load curves are checked against the initial input load curves using a cost function, then a new set of control curve inputs are chosen using autodifferentiation or backpropagation. This process continues until the initial load curves are close enough to the simulated load curves, at which time the last control curve simulated is used as the answer.

To commission a building, the model is run into the future for a time, sensor data is gathered from a building being modeled; how close the model and the sensor information are is checked; then the model is iteratively run, changing model parameters until the model and the sensor information are close enough together. This can be done both for a building model and a resource model.

Figure 20:
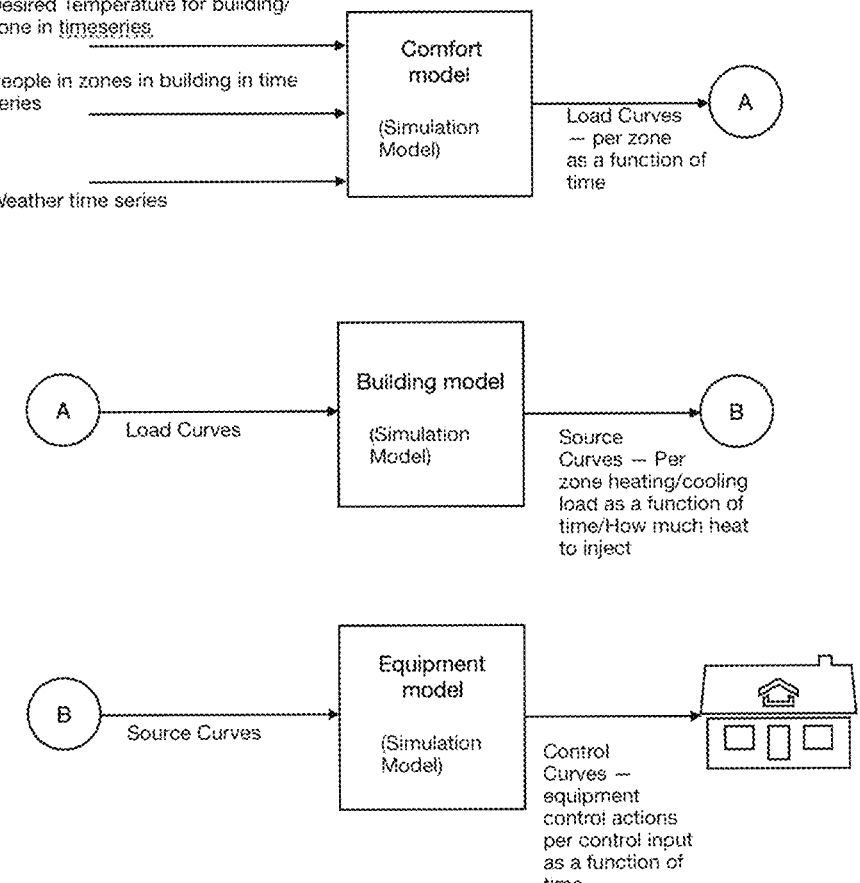
FIG. 20 is a diagram of high level inputs and outputs of a structural (building model) and other related models.
Figure 21:
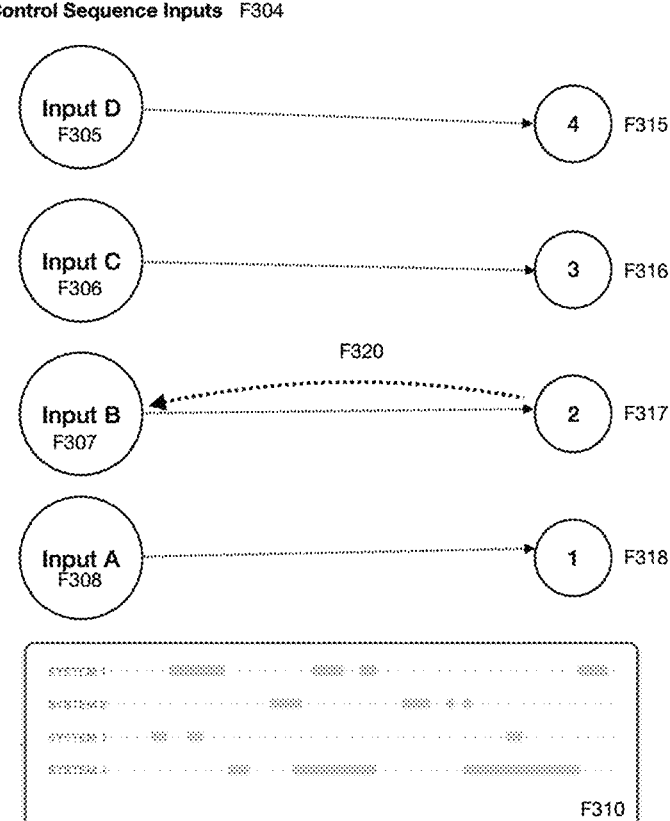
FIG. 21 is a diagram that illustrates four control sequences.
Figure 22:
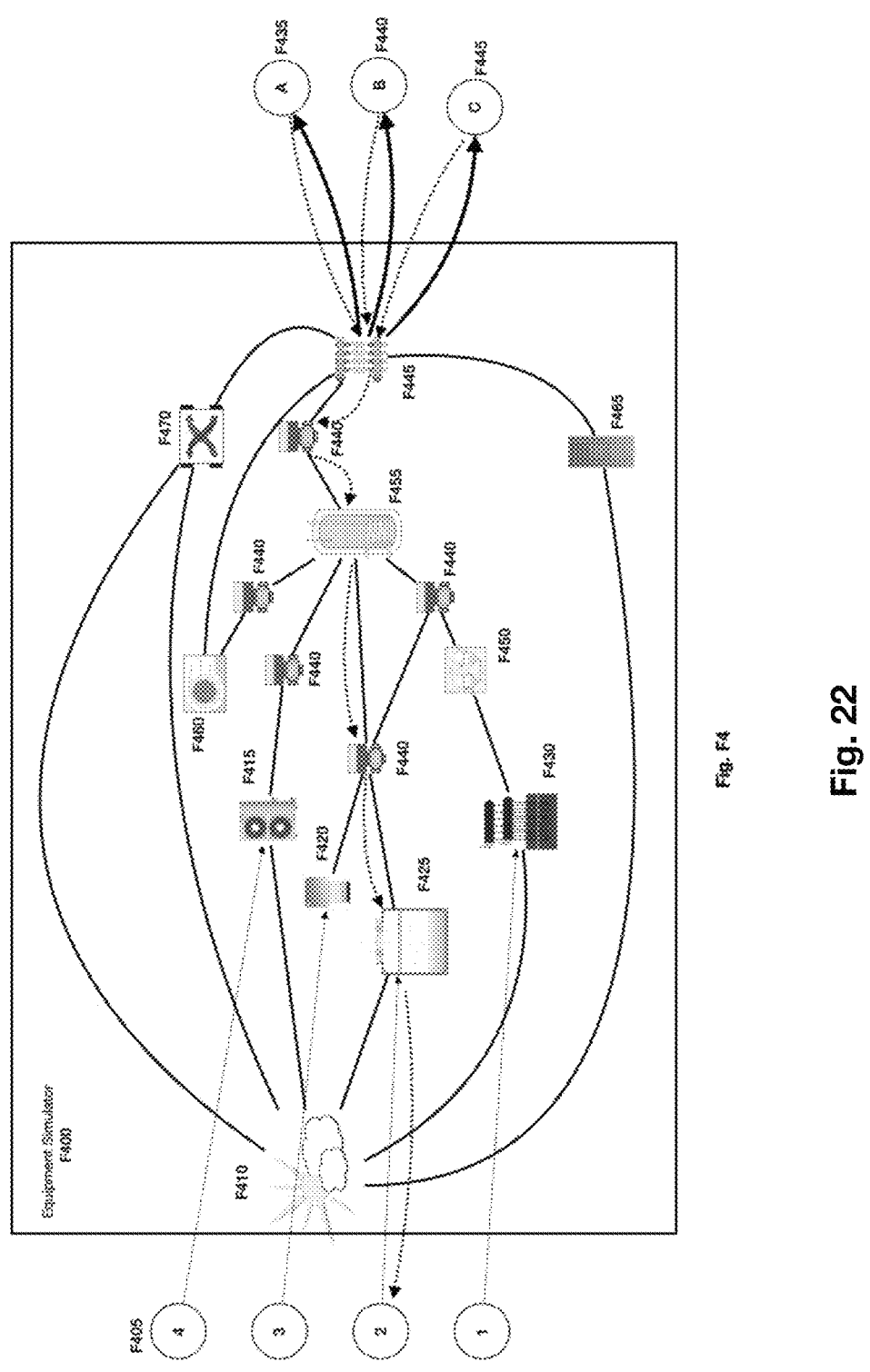
FIG. 22 is a diagram that illustrates running an equipment simulator with four control sequences.

With reference to FIGS. 20, 21, and 22, a system is shown with four control sequence inputs and three zones to be controlled. With reference to FIG. 21, an equipment thermodynamic model is described. This model comprises pieces of equipment and other things that affect them (e.g., the weather) that are connected. The connections allow thermodynamic properties to flow through the model using physics principles. Control sequences F405 are sent to nodes representing equipment F415, F420, F425, and F430. The weather F410 can be included in the equipment model. If included, each of the pieces of equipment that is affected by the weather F410—in this case F415, F425, F430, F465, and F470—has a connection with the weather, as are visualized by the lines between the weather 410 and the equipment F415, F425, F430, F465, and F470. The weather may be a temperature curve.

The equipment model implementation shown here has four pieces of equipment that can be controlled-F415, a hydronic chiller, F420, a gas boiler, F425, a cooling tower, F430, and a ground loop heat pump F435 by feeding control sequences F405 to the nodes representing the equipment as the model is run. Also in the equipment model are a number of pumps F440, a load manifold F445, a ground source heat pump F450, a hot water tank F455, a fan F460, a PV Panel, and a Heat Recovery Ventilator F470. This may model the equipment in an existing building or may model equipment in a simulated building.

With reference to FIG. 21, since there are four pieces of equipment that can be controlled (each with a single controller), the model uses four time series control sequence input curves (F305, F306, F307, F308) as input. Some pieces of equipment have more than one control. In such a case, the total number of controls may determine the number of control sequence curves. Some of the controls have restrictions in values that they can input. These restrictions may be reflected in the values that are allowed for the control sequence inputs, with disallowed values for the control also being disallowed for the inputs F304. If some control values allow only some values, those restrictions may affect the chosen numbers. For example, systems may be either on or off, as in this example. The first time the equipment model is run, an initial time series control sequence F115 (or sequences) must be chosen. The values may be chosen randomly.

F310 shows a sample of control sequence inputs. For these pieces of equipment, the allowable values are on and off. Systems 1-4 show periods where the equipment is on, and other periods where the equipment is off.

With reference to FIG. 22, an equipment thermodynamic model F410 is shown. The numbers 1 through 4 and their attached arrows represent the control sequence inputs being fed into equipment that accepts inputs F415, F420, F425, F430. Notice that the boiler F420 is not affected by the weather, unlike the other equipment that will be controlled to provide state (in this case, heat) into zones within a simulated building. The state (in this case heat) diffuses through the equipment model to, in this case, a load manifold. For this instance, with reference to figure F5, that state is used to determine what the state will be at the three zones F525, F530, and F535, in this model, for a given time period. The state is defined as temperature output curves F530, F540, F550. A cost function F125, F570 is then used to measure the difference between these state output curves F530, F540, F550, and the Target State Needed by Zone Path curve(s) F110, F555, F560, F565 (target curves). The target curves are the ground truth. A cost function comprises something (or things) to be minimized or maximized in the equipment model. For example, the cost function doesn't only measure how well a state output curve F530, F540, F550 matches a Target State Needed by Zone Path curve(s) F110, F555, F560, F565, but also meets some other criteria, such as if it does so at the cheapest energy cost. Some of the values that the cost function F205 can be checked to see if it minimizes or maximizes are a next time series control sequence of operation error F210, a next time series output path error F215, an energy cost F220, a state cost F225, least short cycling frequency F230, frequency of sequence changes F235, equipment life cost F240, or comfort value F245.

Figure 23:
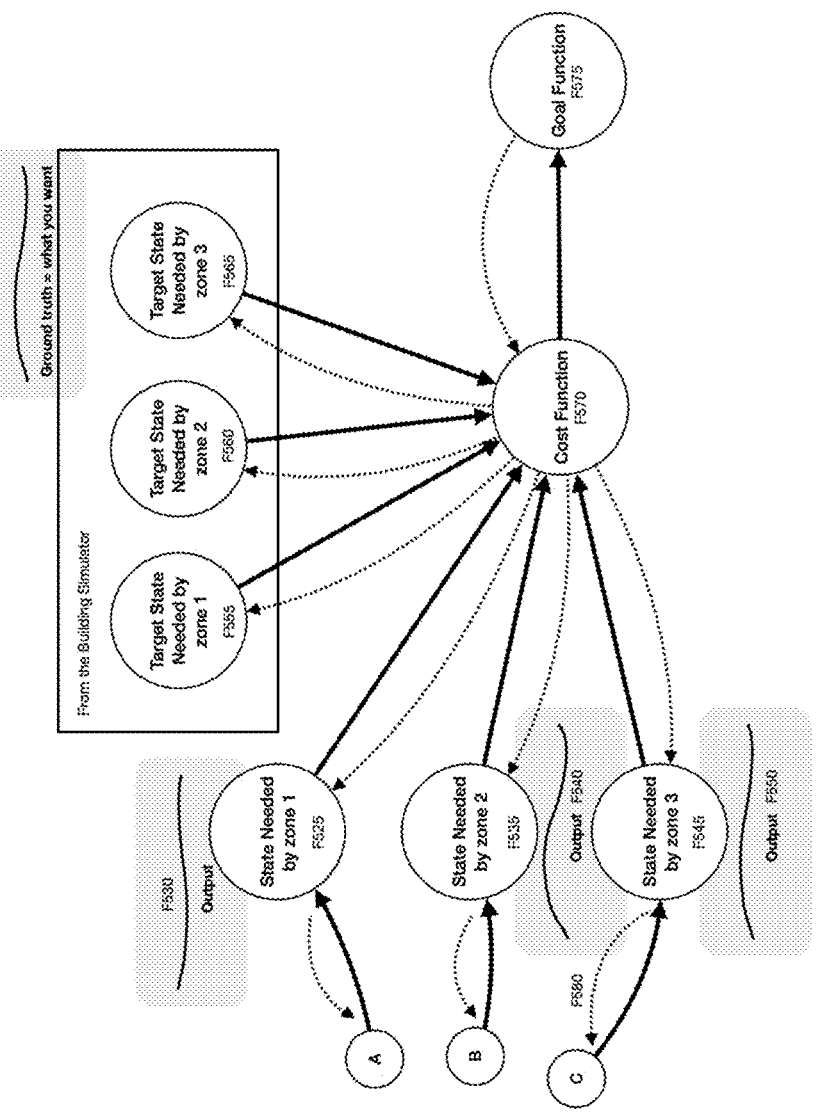
FIG. 23 is a diagram that illustrates state moving through an equipment simulator.

With continuing reference to FIGS. 21, 22, and 23, once the cost function value has been determined, a new set of control sequence inputs must be determined. In some versions, differentiation is used to figure out the next set of control sequence inputs. Generally, the current outputs are compared with the desired outputs. what direction a new set of inputs should move towards is determined. Then, using that information, new inputs are chosen. If a differentiable function is being used to run the thermodynamic model, then, in one implementation, a reverse gradient of the cost function is taken forward, then a gradient of the thermodynamic model is sequentially taken backward to the inputs to determine a new set that should more closely produce output that more closely approximates the ground truth. Those of skill in the art will recognize that this is very similar to backpropagation.

VI. Computing Environment

Figure 19:
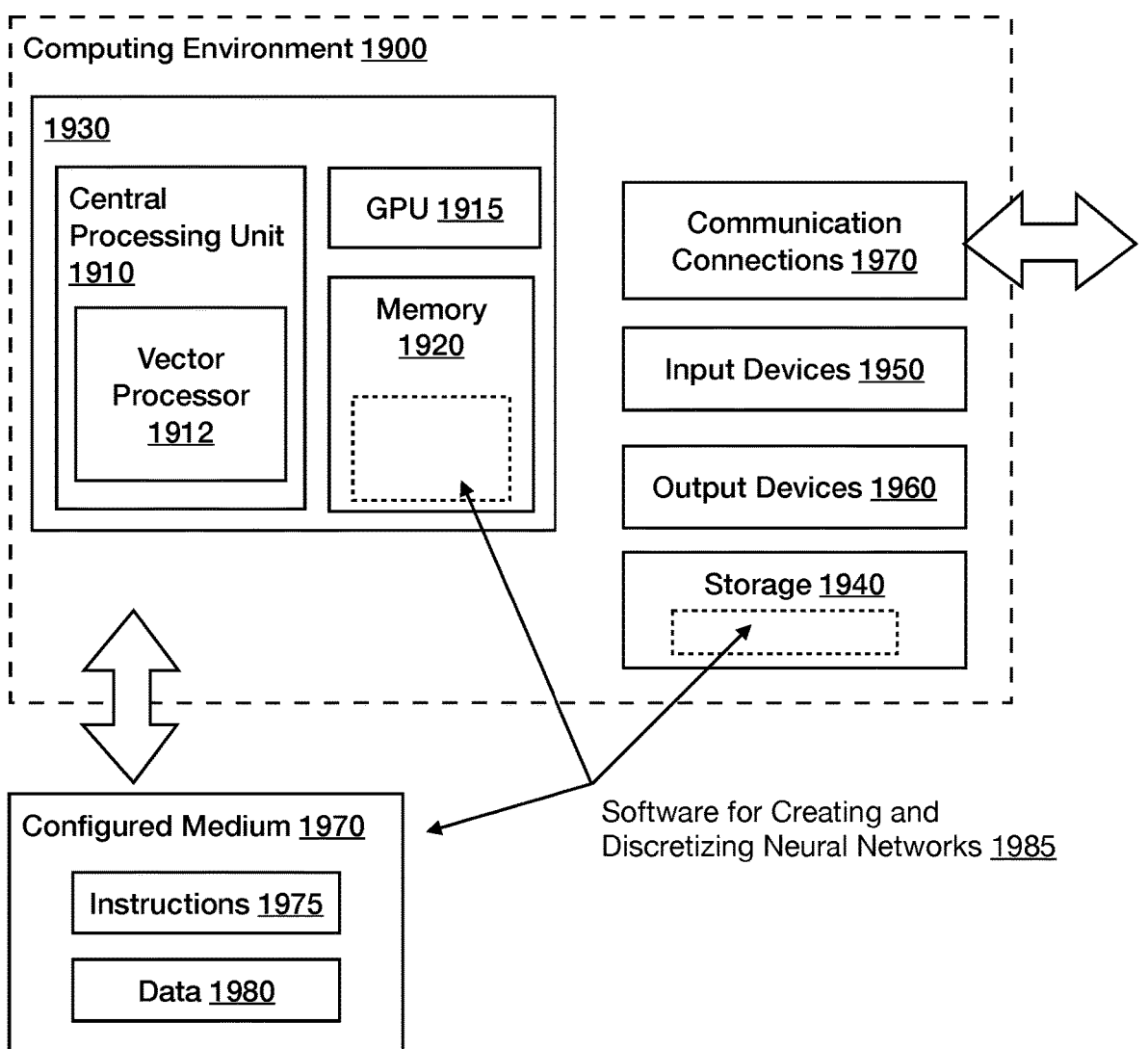
FIG. 19 is a block diagram of an exemplary computing environment in conjunction with which described embodiments can be implemented.

FIG. 19 illustrates a generalized example of a suitable computing environment 1900 in which described embodiments may be implemented. The computing environment 1900 is not intended to suggest any limitation as to scope of use or functionality of the disclosure, as the present disclosure may be implemented in diverse general-purpose or special-purpose computing environments.

With reference to FIG. 19, the computing environment 1900 includes at least one central processing unit 1910 and memory 1920. In FIG. 19, this most basic configuration 1930 is included within a dashed line. The central processing unit 1910 executes computer-executable instructions and may be a real or a virtual processor. It may also comprise a vector processor, which allows same-length neuron strings to be processed rapidly. The environment 1900 further includes the graphics processing unit GPU at 1915 for executing such computer graphics operations as vertex mapping, pixel processing, rendering, and texture mapping. In a multiprocessing system, multiple processing units execute computer-executable instructions to increase processing power and as such the vector processor 1912, GPU 1915, and CPU can be running simultaneously. The memory 1920 may be volatile memory (e.g., registers, cache, RAM), non-volatile memory (e.g., ROM, EEPROM, flash memory, etc.), or some combination of the two. The memory 1920 stores software 1985 implementing the described methods of neural net creation and discretization.

A computing environment may have additional features. For example, the computing environment 1900 includes storage 1940, one or more input devices 1950, one or more output devices 1960, and one or more communication connections 1970. An interconnection mechanism (not shown) such as a bus, controller, or network interconnects the components of the computing environment 1900. Typically, operating system software (not shown) provides an operating environment for other software executing in the computing environment 1900, and coordinates activities of the components of the computing environment 1900. The computing system may also be distributed; running portions of the software 1985 on different CPUs.

The storage 1940 may be removable or non-removable, and includes magnetic disks, magnetic tapes or cassettes, CD-ROMs, CD-RWs, DVDs, flash drives, or any other medium which can be used to store information and which can be accessed within the computing environment 1900. The storage 1940 stores instructions for the software 1985 to implement methods of neuron discretization and creation.

The input device(s) 1950 may be a touch input device such as a keyboard, mouse, pen, or trackball, a voice input device, a scanning device, touchscreen, or another device that provides input to the computing environment 1900. For audio, the input device(s) 1950 may be a sound card or similar device that accepts audio input in analog or digital form, or a CD-ROM reader that provides audio samples to the computing environment. The output device(s) 1960 may be a display, printer, speaker, CD-writer, or another device that provides output from the computing environment 1900.

The communication connection(s) 1970 enable communication over a communication medium to another computing entity. The communication medium conveys information such as computer-executable instructions, compressed graphics information, or other data in a modulated data signal. These connections may include network connections, which may be wireless connections, may include dial-up connections, and so on. The other computing entity may be a portable communications device such as a wireless hand-held device, a cell phone device, and so on.

Computer-readable media are any available non-transient tangible media that can be accessed within a computing environment. By way of example, and not limitation, with the computing environment 1900, computer-readable media include memory 1920, storage 1940, communication media, and combinations of any of the above. Configurable media 1970 which may be used to store computer readable media comprises instructions 1975 and data 1980.

Moreover, any of the methods, apparatus, and systems described herein can be used in conjunction with combining abstract interpreters in a wide variety of contexts.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A neural network creation system, the system comprising: a memory and a vector processor configured to:
   determine structure elements for at least a first subsystem and a second subsystem in a digital representation of a structure;
   build a neuron for each structure element in the first subsystem and the second subsystem, each neuron comprising: an input, an output, and a parameter;

build extra neurons for each subsystem that has fewer structure elements than a subsystem with a greatest number of neurons, such that each has an equal number of neurons;

connect the neurons associated with the first subsystem making a first neuron string; and connect the neurons associated with the second subsystem making a second neuron string, the input of each next one of the neurons in a neuron string being connected to the output of a preceding one of the neurons to create a neural network;

assign a value to the parameter in at least one neuron, the value representing a thermodynamic aspect of an associated structure element the neuron represents;

such that as the neural network is run, the parameter value changes, reflecting thermodynamic aspects of the structure element;

use changes of the parameter value to determine a control setting on a piece of equipment within the structure; and such that the first neuron string and the second neuron string can be run simultaneously on the vector processor.

2. The system of claim 1, further comprising building an inner neuron which comprises representation of state within the structure, and connecting the first neuron string to the inner neuron.

3. The system of claim 2, wherein the structure comprises a first room and a second room, a set of neuron strings is associated with the first room and a set of neuron strings is associated with the second room, a wall is shared between the first room and the second room, the shared wall is represented by one wall string in the set of neuron strings associated with the first room, the shared wall is represented by no strings in the set of neuron strings associated with the second room, and wherein n inner neuron associated with the second neuron string is connected to the wall.

4. The system of claim 1, wherein the parameter comprises resistance or capacitance.

5. The system of claim 2, further comprising building an outside neuron which comprises representation of air state outside the structure, and wherein the outside neuron is connected to the first neuron string.

6. The system of claim 2, wherein representation of state within the structure comprises a calculation comprising air volume, furniture volume, heat value related to number of people in the structure, or heat value related to lighting in the structure.

7. The system of claim 1, further comprising determining the value of at least one neuron parameter for at least one neuron; and reporting the value using an output device.

8. The system of claim 1, further comprising the memory and processor further configured to send an instruction to the piece of equipment.

9. A method performed by a vector processor for creation of neural networks, the method comprising:

determining structure elements for at least a first subsystem and a second subsystem in a digital representation of a structure;

building a neuron for each structure element in the first subsystem and the second subsystem, each neuron comprising: an input, an output, and a parameter;

building extra neurons for each subsystem that has fewer structure elements than a subsystem with a greatest number of structure elements, such that each subsystem has an equal number of neurons;

connecting neurons associated with the first subsystem making a first neuron string; and connecting the neurons associated with the second subsystem making a second neuron string, an input of each next one of the neurons in a neuron string being connected to output of a preceding one of the neurons to create a neural network;

assigning a value to the parameter in at least one neuron, the value representing a thermodynamic aspect of an associated structure element the neuron represents;

such that as the neural network is run, the parameter value changes, reflecting thermodynamic aspects of the structure element;

using the change of the parameter value to determine a control setting on a piece of equipment within the structure; and such that the first neuron string and the second neuron string can be run simultaneously on the vector processor.

10. The method of claim 9, further comprising building an inner neuron which comprises representation of state within the structure, and connecting the first neuron string to the inner neuron.

11. The method of claim 10, further comprising building a ground neuron which comprises representation of ground state outside the structure, and connecting the ground neuron to a neuron string whose structure it is representing connects to ground.

12. The method of claim 11, further comprising building an outside neuron which comprises representation of outside state outside the structure, and connecting the outside neuron to a neuron string whose structure it is representing connects to an outside surface.

13. The method of claim 12, comprising building an indoor air neuron that comprises a resistance value and a capacitance value, and connecting the indoor air neuron between the outside neuron and the first neuron string.

14. The method of claim 9, further comprising sending an instruction to the piece of equipment.

15. A non-transitory computer-readable storage medium configured with executable instructions to perform a method for creation and discretization of neural networks, the non-transitory computer-readable storage medium comprising:

instructions for determining structure elements for at least a first subsystem and a second subsystem in a digital representation of a structure, the first subsystem being physically next to the second subsystem;

instructions for building a neuron for each structure element in the first subsystem and the second subsystem each neuron comprising: an input, an output, and a parameter;

instructions for building an extra neuron for each subsystem that has fewer structure elements than a subsystem with a greatest number of structure elements, such that each subsystem has an equal number of structure elements;

instructions for connecting neurons associated with the first subsystem making a first neuron string; and connecting the neurons associated with the second subsystem making a second neuron string, an input of each next one of the neurons in a neuron string being connected to output of a preceding one of the neurons to create a neural network;

such that as the neural network is run, a value of the parameter changes, reflecting thermodynamic aspects of an associated structure element;

instructions for using the change of the parameter value to determine a control setting on a piece of equipment within the structure; and such that the first neuron string and the second neuron string can be run simultaneously on a vector processor.

16. The non-transitory computer-readable storage medium of claim 15, comprising instructions for connecting an inside air neuron to the first neuron string, making an air neuron string.

17. The non-transitory computer-readable storage medium of claim 16, further comprising instructions for connecting an inner neuron, which comprises representation of state within the structure, to the air neuron string.

18. The non-transitory computer-readable storage medium of claim 17, further comprising instructions for connecting an outside neuron, which comprises representation of state outside the structure, to the air neuron string.

19. The non-transitory computer-readable storage medium of claim 18, further comprising instructions for connecting an outside convection neuron between the outside neuron and the first neuron string.

20. The non-transitory computer-readable storage medium of claim 18, further comprising instructions for concatenating an inside air neuron between the inner neuron and the air neuron string.

*   *   *   *   *